US007716121B2

(12) United States Patent
Walsky et al.

(10) Patent No.: US 7,716,121 B2
(45) Date of Patent: May 11, 2010

(54) TRADING SYSTEM WITH INTERNAL ORDER MATCHING

(75) Inventors: Joshua Walsky, Woodcliff Lake, NJ (US); Tyler Moeller, New York, NY (US); John Crouch, New York, NY (US); Walter Bell, Princeton, NJ (US)

(73) Assignee: Broadway Technology LLC, New York, NY (US)

( * ) Notice: Subject to any disclaimer, the term of this patent is extended or adjusted under 35 U.S.C. 154(b) by 479 days.

(21) Appl. No.: 11/861,129

(22) Filed: Sep. 25, 2007

(65) Prior Publication Data

US 2008/0097893 A1 Apr. 24, 2008

Related U.S. Application Data

(63) Continuation of application No. PCT/US2006/013200, filed on Apr. 5, 2006.

(60) Provisional application No. 60/668,929, filed on Apr. 5, 2005.

(51) Int. Cl.
   *G06Q 40/00* (2006.01)
(52) U.S. Cl. .............................. 705/37; 705/26; 705/35; 705/38
(58) Field of Classification Search ................... 705/35, 705/36, 37, 38, 26
   See application file for complete search history.

(56) References Cited

U.S. PATENT DOCUMENTS

| 5,963,923 | A | | 10/1999 | Garber | |
|---|---|---|---|---|---|
| 7,379,909 | B1 | * | 5/2008 | Cruz et al. | 705/35 |
| 7,512,557 | B1 | * | 3/2009 | Fishbain et al. | 705/35 |
| 7,558,753 | B2 | * | 7/2009 | Neubert et al. | 705/37 |
| 2001/0042040 | A1 | * | 11/2001 | Keith | 705/37 |
| 2002/0184136 | A1 | * | 12/2002 | Cleary Neubert et al. | 705/37 |
| 2003/0177082 | A1 | * | 9/2003 | Buckwalter | 705/36 |
| 2004/0034591 | A1 | * | 2/2004 | Waelbroeck et al. | 705/37 |
| 2004/0093300 | A1 | * | 5/2004 | Burns | 705/37 |
| 2004/0172337 | A1 | * | 9/2004 | Spoonhower et al. | 705/26 |
| 2005/0125326 | A1 | * | 6/2005 | Nangalia et al. | 705/37 |
| 2005/0222936 | A1 | * | 10/2005 | Panariti et al. | 705/37 |
| 2006/0036532 | A1 | * | 2/2006 | Silverman et al. | 705/37 |
| 2006/0206404 | A1 | * | 9/2006 | Hatheway et al. | 705/37 |

OTHER PUBLICATIONS

International Searching Authority/USA, Written Opinion, PCT/US06/13200, mailed Apr. 14, 2008, 4 pages.
International Searching Authority/USA, Search Report, PCT/US06/13200, mailed Apr. 14, 2008, 4 pages.

* cited by examiner

*Primary Examiner*—Alexander Kalinowski
*Assistant Examiner*—Gregory Johnson
(74) *Attorney, Agent, or Firm*—Leason Ellis LLP

(57) ABSTRACT

Presented is a computer-based system for exchange order routing over a communication network which includes a client terminal configured to provide an end-user interface between the client terminal and a first server, the interface providing a template for building an order routing strategy including a stipulation string, and to submit one or more orders and the order routing strategy to the first server. A program executable within the communication network to implement the routing strategy by crossing the order on a first electronic exchange, and placing order liquidity on respective second electronic exchanges. A method implements the order routing strategy by receiving an order and a routing strategy containing a stipulation string having parameters of predetermined criteria, a first phase order processing allocates a first order quantity to a crossing location, a second phase order processing allocates a second order quantity to an idle location.

13 Claims, 8 Drawing Sheets

TRADING SYSTEM WITH INTERNAL ORDER MATCHING

CLAIM OF PRIORITY

This application is a continuation of PCT International Application No. PCT/US2006/013200, filed Apr. 5, 2006, which claims the benefit of priority of U.S. Provisional Application No. 60/668,929, filed Apr. 5, 2005, and titled "Trading System with Internal Order Matching." Both applications are hereby incorporated by reference in their entirety.

FIELD OF INVENTION

The present invention relates to improvements in placing and executing orders on electronic exchanges and, in particular, to a system and method for executing orders on an internal electronic exchange while providing portions of the order liquidity to external electronic exchanges.

BACKGROUND OF THE INVENTION

The electronic securities trading marketplace has evolved such that multiple exchanges and brokers often trade the same particular product. For example, many equity products or instruments (e.g., stocks, options, futures, indices, etc.) are tradable on multiple equity exchanges. U.S. Treasury products are tradable with multiple brokers who present their order books electronically, which is similar to how exchanges present their order books, through a similar style of application programmable interface (API).

When buying and selling securities, it is often desirable to buy and sell at the best price available throughout a set of exchanges or brokers (the terms "exchanges" and "brokers" are used herein interchangeably) where a particular product can be traded. Often different exchanges have different prices and liquidity for the same product at the same time, so the decision to buy or sell a given security can mean buying or selling that security on multiple exchanges at the same time. Furthermore, different brokers might charge different commissions for trades done on them and might have different trading rules. A trader might wish to trade on an exchange with lower commissions or more favorable rules, execution price being the same among the exchanges.

Often, a trader wishes to buy (or sell) a certain quantity of a product at a size far greater than what is available in the market at a given time, or at a price better than where the market is willing to sell (or buy) that product. In that case, the trader may wish to show a smaller size than what he really wants to buy or sell, perhaps showing the smaller size among various exchanges at the price he is willing to buy or sell at. The trader might even be willing to buy (or sell) a quantity at a worse price, but doesn't want to show the worse price unless the market moves away from him. As market conditions change and his order is filled, he might want to add more size back into the market or adjust his price on the various exchanges.

A trader may wish to transact with other traders within the same firm or trading desk, or an otherwise "internal" trading group (affiliates, preferred customers and clients, preferred partners, etc.) without showing the general marketplace his or her order. He might be willing to trade at a better price internally than in the marketplace because he doesn't pay commissions or has a favorable relationship with the internal traders. Therefore, he may want to ensure that his orders are always executed internally before being executed externally or show them at a better price internally, while also showing them externally.

Lastly, the various exchanges and brokers in the marketplace generally have wildly different APIs for sending orders and receiving prices, which makes it difficult for those exchanges to all be accessed simultaneously through the same system.

Missing from the art is a unifying system that can allow a group of traders to transact internally with each other, allow a trader to route his order in a favorable way between internal traders and external marketplaces in order to maximize his goal of achieving the best price possible from a preferred set of exchanges without showing his hand, and unify the wildly varying APIs various exchanges provide such that the different exchanges can be accessed from the same end system. The present invention can satisfy these and other needs.

SUMMARY OF THE INVENTION

In accordance with one aspect of the invention, a computer-based system for exchange order routing comprises a communication network which includes a first server having at least one processor configured to support operations of a first electronic exchange marketplace, one or more second servers each having at least one processor configured to support operations of respective second electronic exchange marketplaces, and a client terminal having at least one processor configured to provide an end-user interface between the client terminal and the first server, the end-user interface operable to provide a template for building an order routing strategy that includes a stipulation string, and to submit one or more orders and the order routing strategy to the first server. Further comprising a program executable within the communication network and being configured to implement the routing strategy by attempting to cross the order on the first electronic exchange in accordance with the routing strategy, and by placing order liquidity on the respective second electronic exchanges in accordance with the routing strategy.

In accordance with another aspect of the invention, a method implements an order routing strategy on a computer-based communication network comprising a first electronic exchange market operating on a first server having a processor, one or more second electronic exchange markets operating on respective second servers having a processor, and an end-user interface operating on a client terminal having a processor, the method comprising the steps of receiving at the first terminal an order that defines a quantity component, a price component, and a routing strategy associated with the order, where the routing strategy contains a stipulation string that includes parameters of predetermined criteria, a first phase order processing in accordance with the predetermined criteria parameters so as to allocate a first order quantity to a crossing location, a second phase order processing so as to allocate a second order quantity to an idle location, where the first order quantity fills substantially immediately and the second order quantity fills when trading begins at the idle location. Further including the steps of evaluating rules of the routing strategy in response to an event message, and modifying the routing strategy execution in response to the results of the evaluating step so as to optimize the order processing on at least one of the crossing location and the idle location.

In accordance with a further aspect of the invention, the steps of working a portion of an order quantity at crossing levels on a first electronic exchange and/or at least one of respective second electronic exchanges, giving priority to more aggressively priced crossing levels, and placing the working portions of an order quantity in preference based on at least one of the predetermined criteria.

In accordance with yet a further aspect of the invention, receiving an updated stipulation string for the routing strategy, and performing the first phase order and second phase order processing steps in accordance with predetermined criteria of the updated stipulation string.

These and other aspects, features, steps and advantages can be further appreciated from the accompanying drawing Figures and description of certain illustrative embodiments.

BRIEF DESCRIPTION OF THE DRAWING FIGURES

DETAILED DESCRIPTION OF THE ILLUSTRATIVE EMBODIMENTS

By way of overview and introduction, presented and described are embodiments of an Internal/Consolidated Exchange (ICE) system 100. The ICE system 100 is directed to a combined securities exchange and intelligent order routing system that allows traders to create visible markets internally and externally, so as to optimize access to liquidity pools across the spectrum of internal markets and external brokers and exchanges automatically.

Figure 1:
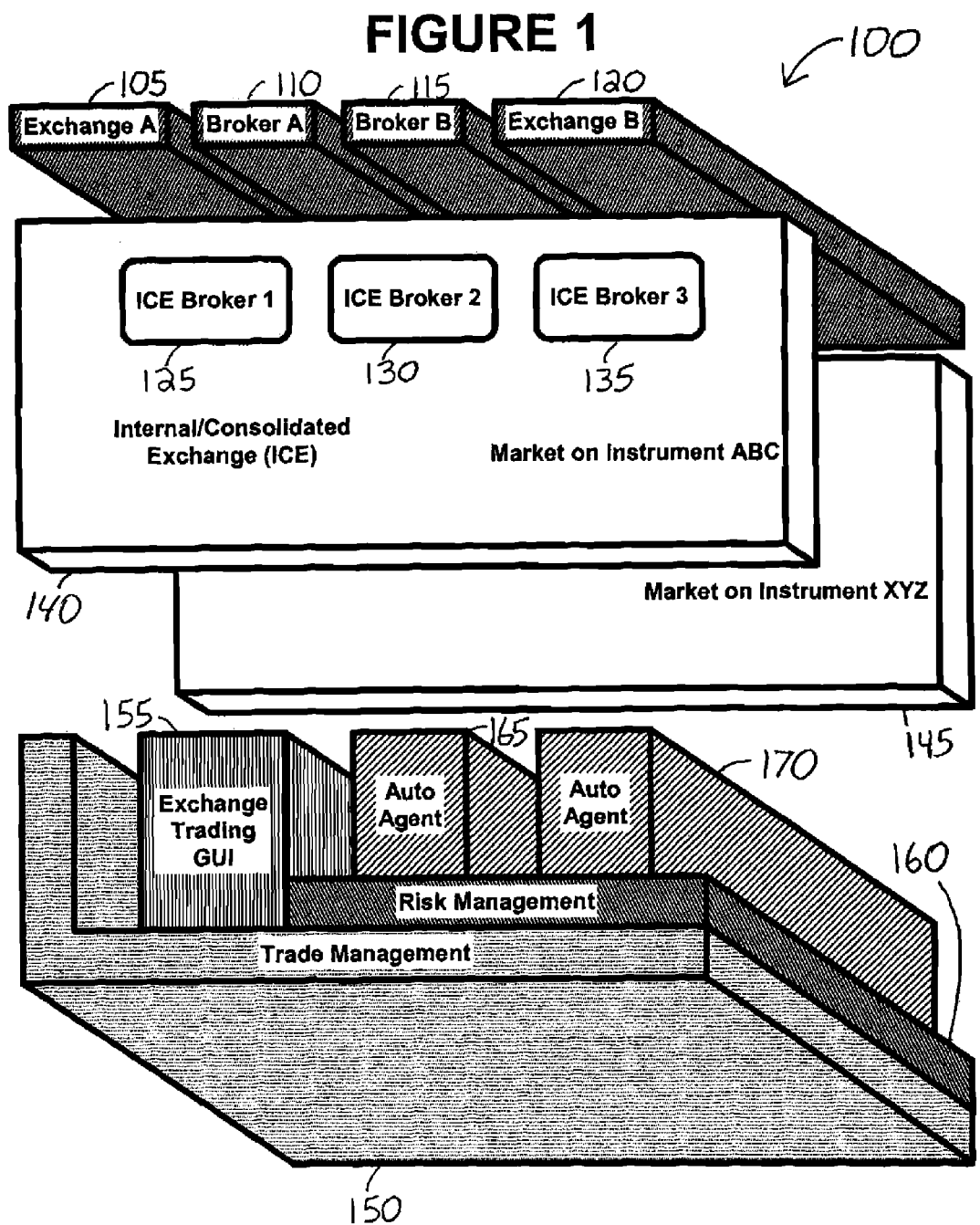
FIG. 1 illustrates an exchange system in accordance with an embodiment of the present invention.

With reference to FIG. 1, ICE system 100 contains an Internal Exchange 140 that maintains orders placed by traders within a firm. Crossing orders within the firm can be matched and filled on the Internal Exchange 140 without being sent to external brokers and exchanges. The Internal Exchange 140 enables a user to post internal markets at prices available only on the Internal Exchange 140, giving preferential pricing treatment to other internal traders. The Internal Exchange 140 also allows Private Markets to be created. Private Markets are markets visible on the Internal Exchange to a pre-selected subset of users. Private Markets in conjunction with the Internal and external exchanges allows a single order to show different prices to different users, thus, giving preferential treatment to some of the users.

The Internal Exchange 140 allows for selected markets to be posted outside the trading groups to sales staff, customers, and affiliates and enables those parties to trade with the firm via a commonly understood exchange paradigm (order book) electronically.

ICE's order routing capabilities can allow for the routing of orders to external brokers and exchanges to access external pools of liquidity as well as internal ones. The routing mechanism can abstract traders from external markets, allowing various algorithms to be employed to ensure that optimal order placement occurs across the full spectrum of external markets accessible to a user. For example, a trader may submit a bid to ICE designated to be routed to the external world.

The Order Router 275 can make the determination of which broker/exchange(s) the order is sent to based on current market conditions, and may change that determination over time as each broker/exchange's market changes.

ICE can broadcast a Consolidated Price Feed 265 containing each Private Market's internal order book and all external order books in a single market data feed.

Orders may be routed to multiple exchanges. ICE can manage order placement to most optimally fill each order to the size requested while managing the chance of overfill based on risk parameters supplied with the order. The system may use customizable Order Router Strategies, or automatic order placement and filling algorithms, to ascertain how to best route an order without named destinations to the various exchanges. Routing can take place dynamically, with orders being moved among exchanges and the Internal Exchange as various market conditions change.

Connectivity to external markets (brokers and exchanges) 105, 110, 115, 120 occurs through Execution Connections 205, 210, 215, 220 (FIG. 2) which provide a bridge between the ICE System and its users and the external markets. These Execution Connections allow a common interface to be presented to ICE System 100 for external markets that may have wildly different connectivity paradigms and order placement models.

Figure 8:
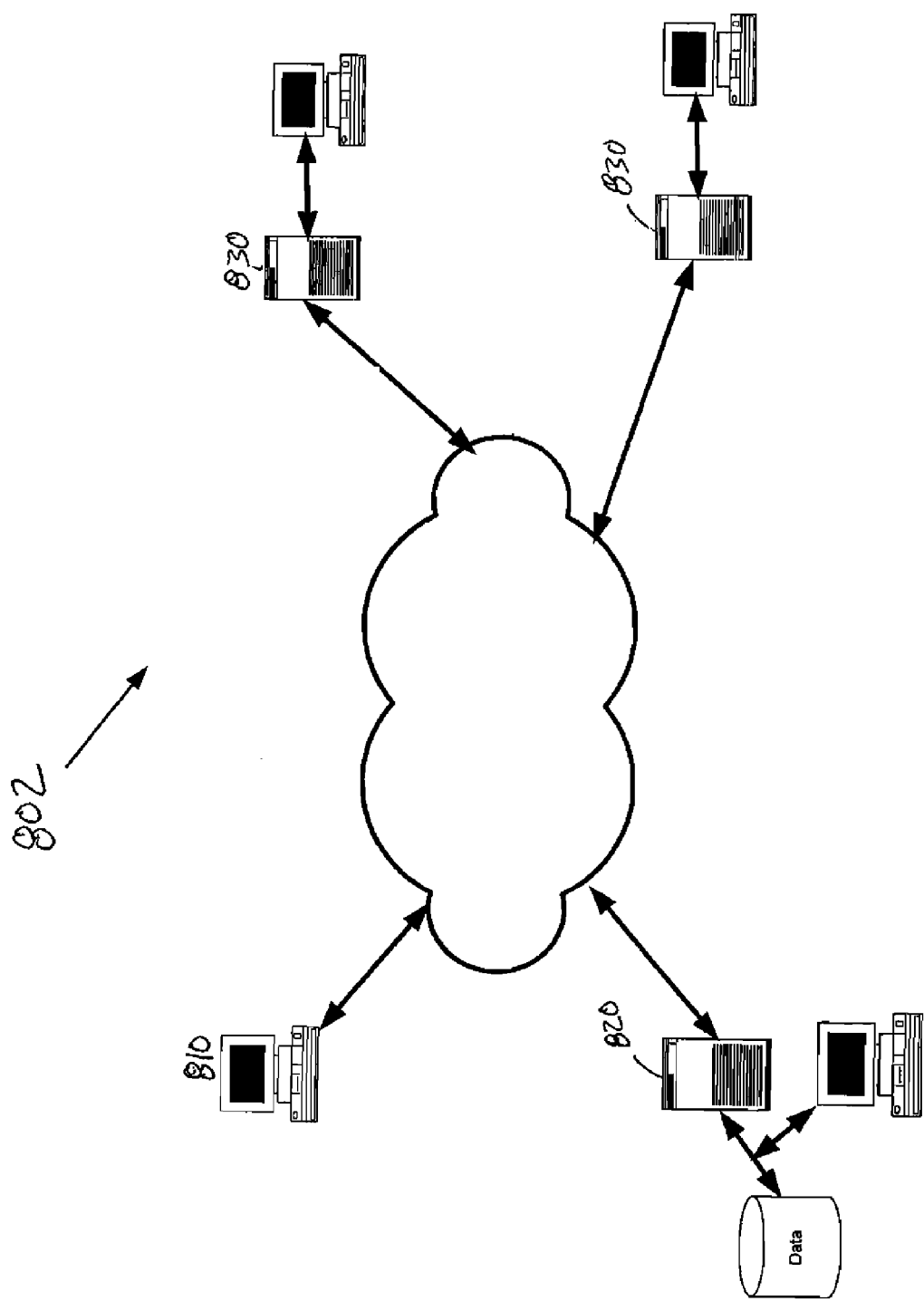
FIG. 8 depicts components of an exemplary environment in which processes embodying the invention can be implemented.

FIG. 8 shows components of an exemplary environment in which processes embodying the invention can be implemented. Not all the components may be required to practice the invention, and variations in the arrangement and type of the components may be made without departing from the spirit or scope of the invention. The particular component configuration is not critical to the present invention.

FIG. 8 illustrates a communication network 802 that can be a local area network ("LAN"), a wide area network ("WAN"), the Internet, or a combination of all three interconnected by routers (not shown). A router is a intermediary communications network device that links many computers through a mesh of possible connections, a router receives transmitted messages and forwards them to their correct destinations over available routes. On an interconnected set of networks—including those based on differing architectures and protocols—a router acts as a link between the networks, enabling messages to be sent from one to another. The communication links within a network typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links such as WiFi, WIMAX, GPRS, CDMA, TDMA, TSM, hybrids of the foregoing or future technologies, or other communications links known to those skilled in the art. Communication to the communication network 802 is preferably by an interface unit associated with a client computer 810, the interface unit can be a remote computer (not shown).

Furthermore, computers, and other electronic devices can be remotely connected to the communication network via a modem and temporary telephone link. The number of WANs, LANs, and routers may be increased or decreased arbitrarily and is independent of the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use Transmission Control Protocol/Internet Protocol ("TCP/IP") and other packet based protocols to communicate with one another. An embodiment of the invention may be practiced over the Internet without departing from the spirit or scope of the invention. Processes embodying the invention also may be practiced in a peer-to-peer or grid computing architecture, without departing from the spirit or scope of the invention.

FIG. 8 shows an exemplary first server 820 for the communication network 802. Server 820 may operate to support operations of a first electronic exchange marketplace. Transactions involving the buying and selling of financial instruments (e.g., stocks and bonds, etc.) may take place over the communication network 802 under the control, partial control, or assistance of server 820. Similarly, second servers 830, 830 support the operation of respective second electronic exchange marketplaces, where transactions involving the buying or selling of financial instruments occur.

Those of ordinary skill in the art will appreciate that the servers 820, 830 may include many components which are not shown in FIG. 8. However, FIG. 8 shows enough components sufficient to disclose an illustrative environment for practicing embodiments of the present invention. Servers 820, 830 are connected to the communications network via a network interface unit. Those of ordinary skill in the art will appreciate that the network interface unit includes the necessary circuitry for connecting servers 820, 830 to communication network 600, and is constructed for use with various communication protocols such as the TCP/IP protocol. Typically, the network interface unit is a card contained within the servers.

Servers 820, 830 also can include a central processing unit, a video display adapter, and a mass memory, all connected via a bus. The mass memory generally includes random access memory ("RAM"), read-only memory ("ROM"), and one or more permanent mass storage devices, e.g., a hard disk drive, a tape drive, an optical drive, and/or a floppy disk drive. The mass memory stores an operating system that controls the operation of servers 820, 830. A basic input/output system ("BIOS") is also provided for controlling the low-level operation of the servers. The hard disk drive is utilized by servers 820, 830 to store, among other things, application programs, databases, and program data.

The mass memory may include volatile and nonvolatile, removable and non-removable media, which can implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a web site. More specifically, the mass memory may store applications, including but not limited to: a WWW server application, email server application, and programs. WWW server application includes computer executable instructions which, when executed by server 820, 830, generate browser displays, including performing the logic described above. Serves 820, 830 may include a JAVA virtual machine, an SMTP handler application for transmitting and receiving email, an HTTP handler application for receiving and handing HTTP requests, and an HTTPS handler application for handling secure connections. The HTTPS handler application may also be used for communication with an external security application to send and receive sensitive information, such as email, in a secure fashion.

Client computer 810 includes a central processing unit (CPU), a video display adapter, and memory. The memory generally includes RAM, ROM, and a permanent mass storage device, such as a disk drive. The memory stores an operating system, a BIOS, and programs for controlling the operation of the client computer. The memory can also be loaded with client software specific to practicing embodiments of the present invention. It will be appreciated that these components may be stored on a computer-readable medium and loaded into memory of client computer 810 using a drive mechanism associated with the computer-readable medium, such as a floppy disk drive, an optical drive, such as a CD-ROM/DVD-ROM drive, and/or a hard disk drive. An input/output interface can also be provided for receiving input from a mouse, keyboard, or other input device. The memory, network interface unit, video display adapter, and input/output interface are all connected to the processing unit via a bus. Other peripherals may also be connected to the processing unit in a similar manner. For example, the interface may also be provided at a terminal, for displaying accessed data, computed scores, and so on. Executable program code that includes operating instructions to implement embodiments of the present invention can be resident in either servers 820, 830 or client computer 810.

It should be understood that the client machine could be embodied as any one of a great variety of electronic devices ranging from general purpose computing machines such as workstations, desktop, laptop and notebook computers, thin clients, and terminals to less general devices such as personal digital assistants (PDAs) or smart phones, to a special purpose devices. Regardless of the physical form of the client computer, it includes a local memory, a processor, and input/output capabilities to permit interaction with a user.

Those of ordinary skill in the art will appreciate that client computer 810 may include many more components than those shown in FIG. 8. However, it is not necessary that those generally-conventional components be shown in order to disclose an illustrative environment for practicing embodiments of the present invention.

Figure 2:
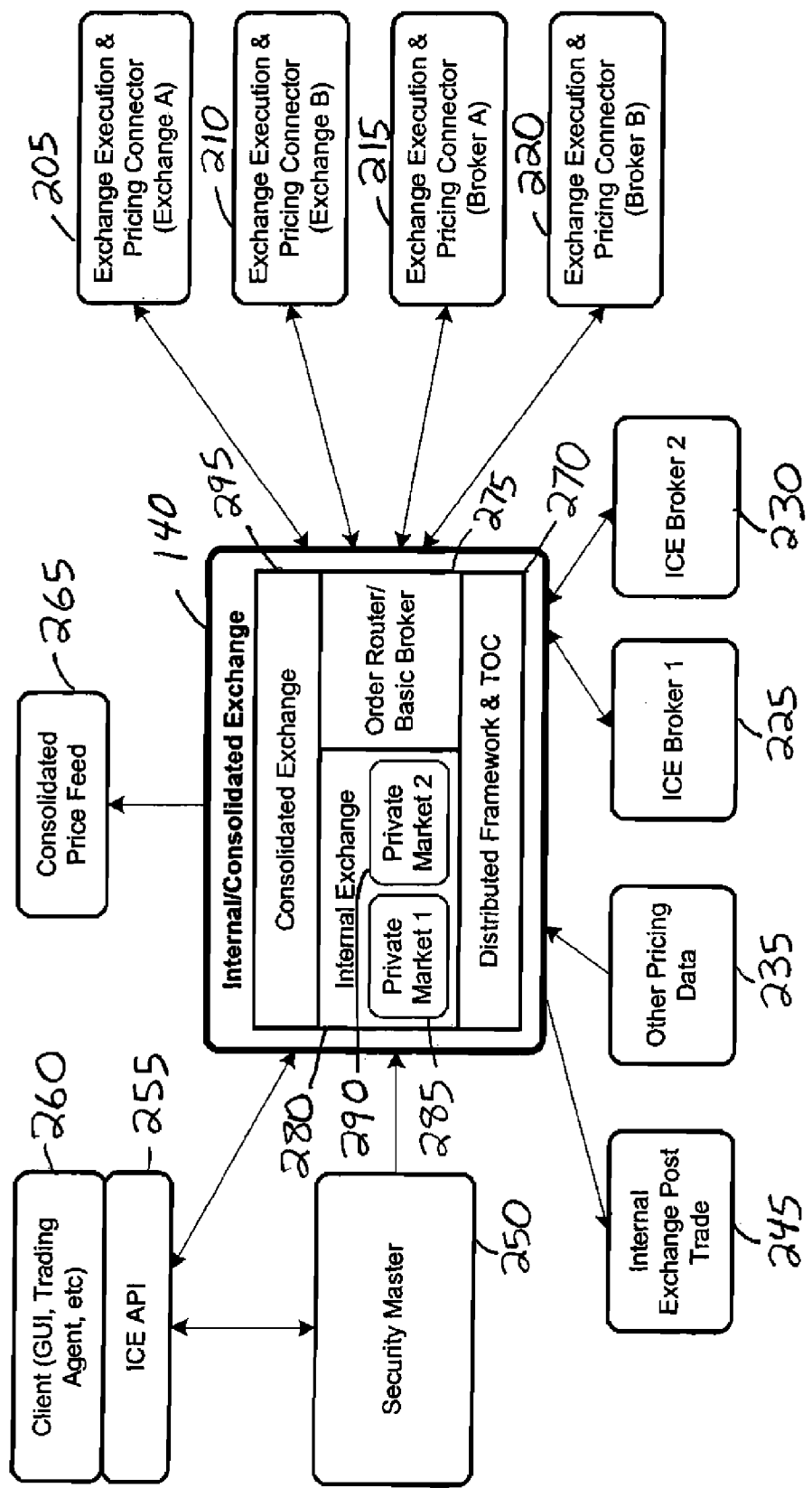
FIG. 2 is an illustration of the architecture of the embodiment shown in FIG. 1.

FIG. 2 is an illustration of the component architecture of the ICE System 100. All components of the ICE System 100 (the Internal Exchange 140, the Execution Connections 205, 210, 215, 220, and the Order Router 275) present the same unified API 255 to users of the ICE System 100, so users can trade on any component the same as any other component.

This system architecture depicted in FIG. 2 supports connections to ICE from both internal and external sources using the ICE API 255. Clients accessing ICE include trader GUIs 260, automated trading systems, Trading Agents, and potentially sales staff, customers, or affiliates outside the immediate trading desk to whom a client provisions ICE access. ICE includes the following components: Consolidated Exchange and Price Feed 265; Internal Exchange 280; Order Router 275; Exchange/Broker Execution and Pricing Connectors 205, 210, 215, 220; ICE Uniform API 255; Trade Management Integration (Post-Trade 245 and Security Master 250); as well as Order Router Strategies Security; Scalability; Fault-Tolerance; and System Monitoring features.

Orders can be accompanied by order stipulations that control how the order is treated and evaluated within the Order Router 275 and Internal Exchange 280. The Consolidated Price Feed 265 contains live pricing data from each external exchange and broker and the current Internal Exchange Order Book. The pricing feed 265 or subsets of the feed data (e.g., only internal exchange pricing) can be used in trading GUIs, automated trading models, Trading Agents, Order Router Strategies, or published externally.

The Internal Exchange 280 allows "Private Markets" to be defined which restrict the visibility of various order books to particular users. A Consolidated Price Feed 265 can exist for each Private Market.

The Internal Exchange 280 is a traditional bid/offer exchange, or a work-up exchange, that manages Bids/Offers and Buys/Sells to be listed internally (i.e., locally within a brokerage, trading firm, investment house, etc.) by authorized users in an Order Book for each traded instrument. Orders received at the same price on the same side of the market are placed in fill priority based on a combination of time-priority (the time each order was received by exchange) and order stipulation.

When opposite orders within the Order Book match (in the bid/offer model), the matching size is considered filled for each side of the match. Partial fills are possible if one order contains more size than the other matching order. Orders on the crossing side are filled in priority. This technique of order matching does not allow locked markets. Alternatively, in the work-up model, bids and offers can exist at the same crossing price. A buy or sell at the crossing price is required to initiate trading and fill against the crossing bid or offer.

All crossing orders are usually filled at the best possible prices, meaning that price improvement can occur. When a crossing order's price is outside the best price on the opposite side of the market, the best price(s) from the opposite side of the market are filled first.

The Internal Exchange 280 supports the concept of "Private Markets" 285, 290 that are visible only to selected users. A Private Market 285, 290 may "inherit" from another Private Market 285, 290 to display all of the orders visible in the "parent" Private Market 285, 290. Only orders that specify that they have prices available in a particular Private Market can be traded in that market and any of its "children" markets. The top level Private Market is considered a "Public Market" that all users can see.

Order stipulations allow the availability of an order within various Private Markets 285, 290 to be configured per order. Each order that is sent to the Internal Exchange 280 may stipulate Private Markets 285, 290 in which the order is tradable and a visible and/or a hidden price for each Private Market. The visible price is a price to be displayed within the order book for that Private Market 285, 290 and all children Private Markets 285, 290. The hidden price allows the order to specify a better price at which it is allowed to be filled. This hidden price is not displayed within the order book for the Private Market 285, 290.

Hidden order prices are not displayed in the Internal Exchange's price feed 265 for a given Private Market, but can match like normal visible prices when crossed. Hidden prices are placed after visible orders in fill priority for a given price. If a visible order is placed on the same side and price as a hidden order, the visible order moves ahead of the hidden order in fill priority.

If an order stipulates a visible or hidden price in a child market, that stipulation overrides a parent stipulation. For example, if there is a 99-12+ bid for 10 mM in the public market, all child private markets see the 12+ bid. However, if the order stipulates to trade as a 99-126 bid for 10 mM in a child market, that bid can be shown instead in the specified market and all of its children. Similarly, hidden orders are propagated to child markets. If the 99-126 bid has a hidden price of 99-130 in a child market, that market shows the 99-126 bid visibly, but list the 99-130 bid as a hidden bid internally to that child market, and can match sells with a price of 99-130 or lower.

In an alternative embodiment, a single market can be used in which each order can be granted permission to only be shown to given users. This effects the same end result as Private Markets. Further, the Internal Exchange 280 supports a number of other stipulations that may be attached to an order to change its behavior within the Internal Exchange 280. These stipulations may be selectively enabled or disabled through the Internal Exchange's configuration. Not all of the stipulations below need be accessible by users of the Consolidated Exchange, as the Consolidated Exchange 295 uses some of the stipulations below to perform internal operations.

The Internal Exchange's stipulations may include:

1. Conditional orders. These are orders that are likely to fill but are not guaranteed to do so. These orders are typically orders that have also been placed on an external market but are cancelled externally before being filled internally (to ensure the order is not filled both internally and externally). A conditional order does not fill a matching crossing order until its condition (e.g., cancellation of the external order) has been completed. Conditional orders are placed behind hidden orders in fill priority. This placement remains the case even if a conditional order has identified a crossing order than can fill it and has started processing its condition. If another order arrives on the same side and the same price as the conditional order, the new order can move ahead of the conditional one in time-priority, filling the crossing order and leaving the conditional order unfilled (and needing to re-submit its external order).

2. Indicative orders. Orders may be listed as being "indicative" on the Internal Exchange 280, which means they cannot actually be filled. An indicative order is shown in the Private Market's order book last in fill-order (behind conditional orders) and with a special "indicative" indicator. These orders provide an indicator to traders that there is size a particular trader may be willing to trade, but is not willing to fill at the immediate moment. Indicative orders are placed behind conditional orders in fill-priority. At any given time, an indicative order may be turned into a "firm" order at which point it behaves like any other regular order. Indicative orders can be used to display "indicative" prices/sizes on the Internal Exchange while an order is being listed externally and is waiting to meet some external criteria before the order is willing to let itself be filled internally. Further, the use of Indicative orders can be used to implement Conditional orders.

3. Fill or kill orders. These orders can immediately cross and fill up to their order size. Any unfilled size is immediately canceled and never placed in the Order Book as a passive order. Fill or kill orders may have a minimum size, which means the given size must be able to be filled for the order to be filled at all. If the minimum size cannot be filled, the order is never placed in the Order Book.

4. Minimum size orders. These orders have a minimum fill size which needs to be immediately filled if the order is to be filled at all. These orders either immediately cross and fill their minimum size or be immediately canceled and never placed in the Order Book. If a minimum size order's minimum size is filled but the total order size is not, the remaining size is placed in the Order Book as a passive order.

The invention is not so limited as to only support the above-mentioned order types. Other order types, such as the commonly known good-to-cancel, hidden orders, fill and kill orders are all supportable on the Internal Exchange 280.

In one embodiment, the Internal Exchange system 100 can add commissions to its trades. Commissions can be set via a configurable commission schedule. Different commissions can be set for liquidity providers and liquidity takers (passive or active orders) and by trading user. Commissions can either be included in the trade price or recorded separately from the trade price in a trade record as a separate fee.

Figure 3:
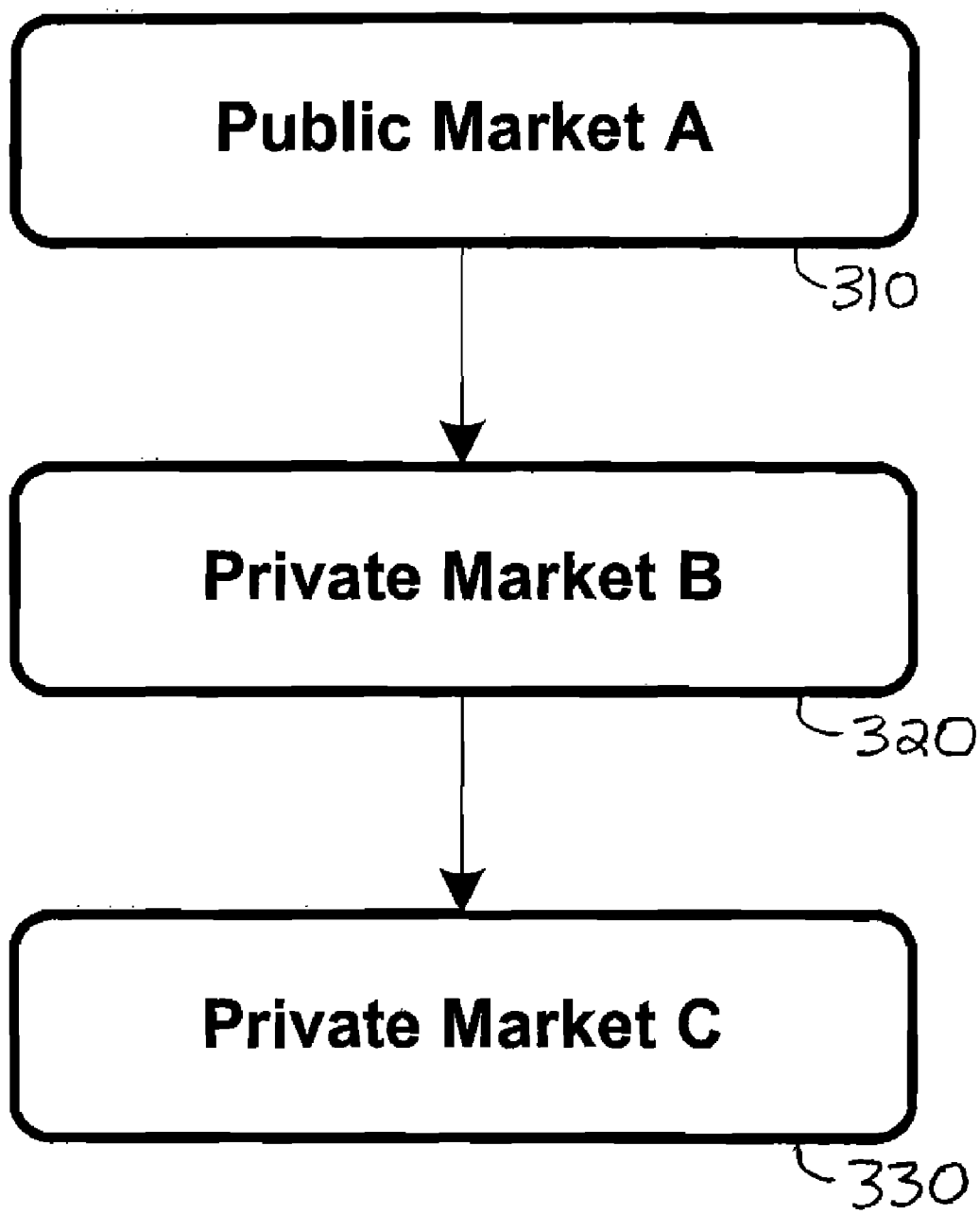
FIG. 3 depicts a hierarchy of private markets.

The Internal Exchange system 100 can produce market pictures or order books for each Private Market 285, 290. To illustrate an example of how Private Markets 285, 290 work, assume the hierarchy of private markets shown in FIG. 3. Private Market B 320 inherits from Public Market A 310, meaning it is a child of Public Market A 310. All orders placed in Public Market A 310 can be shown in Private Market B 320 (unless an order in Public Market A 310 explicitly overrides its Private Market B 320 price/size).

The orders shown in Table 1, below, are received by the Internal Exchange 280 with the price, size, and stipulations indicated and in sequential time order. Table 2-4, below, illustrate the resulting order books constructed in each of the Private Markets 285, 290.

In the order books, the following notations are used in the size columns: TradableSize, UnavailSize (1stOrder#: 1stOrderSize, 2ndOrder#:2ndOrderSize, . . . ), where TradableSize indicates the total size visible and tradable by users of the Private Market at the given price; UnavailSize indicates the total size unavailable at the given price because its either indicative or conditional; and the numbers in parenthesis indicate the individual orders making up the total tradable and unavailable size at the given price.

The following letters are possible parameters following the number (#) sign:

An "H" after an order # represents a hidden order. This order is listed in the order book, but is not visible to any users of the Internal Exchange 280. If all orders at a given price level are hidden, the level is shown in italics in the tables, indicating that the given price level is invisible to users, even though there are orders within the order book that can fill at that price level.

A "U" after an order # represents an unavailable order. This order is listed in the order book and is visible to users of the Internal Exchange 280, but users cannot fill against that size.

A "C" after an order # represents a conditional order or an indicative order. This order can have to have an external condition fulfilled (e.g., the order being pulled from an external exchange 105, 110, 115, 120), or it can be made firm (not indicative) before it can fill internally.

TABLE 1

Orders Received by Internal Exchange

Order 1: A: 99-12+ bid for 10
Order 2: A: 15 offer at 99-132, B: 15 offer at 99-130, C: hidden 15 offer at 99-126
Order 3: A: 10 offer at 99-132
Order 4: C: 99-12+ bid for 15
Order 5: B: unavailable 99-116 bid for 50
Order 6: A: conditional 99-120 bid for 10
Order 7: B: hidden 99-11+ bid for 20
Order 8: C: 99-11+ bid for 30
Order 9: B: 99-120 bid for 10

TABLE 2

Public Market A 310 Price Feed/Visible Picture

| Offer Size | Offer Price | Bid Price | Bid Size |
|---|---|---|---|
| 25 (2:15, 3:10) | 99-132 | | |
| | | 99-12+ | 10 (1:10) |
| | | 99-120 | 10 (6:10C) |

TABLE 3

Private Market B 320 Price Feed/Visible Picture

| Offer Size | Offer Price | Bid Price | Bid Size |
|---|---|---|---|
| 10 (3:10) | 99-132 | | |
| 15 (2:15) | 99-130 | | |
| | | 99-12+ | 10 (1:10) |
| | | 99-120 | 20 (9:10, 6:10C) |
| | | 99-116 | 0, 50U (5:50U) |
| | | 99-11+ | 0 (7:20H) |

TABLE 4

Private Market C 330 Price Feed/Visible Picture

| Offer Size | Offer Price | Bid Price | Bid Size |
|---|---|---|---|
| 10 (3:10) | 99-132 | | |
| 15 (2:15) | 99-130 | | |
| 0 (2:15H) | 99-126 | | |
| | | 99-12+ | 25 (1:10, 4:15) |
| | | 99-120 | 20 (9:10, 6:10C) |
| | | 99-116 | 0, 50U (5:50U) |
| | | 99-11+ | 30 (8:30, 7:20H) |

Note that in the example shown, visible orders are placed in fill priority ahead of hidden orders (order 9 is ahead of order 6 in Private Markets B 320 and C 330) and conditional orders (order 8 is ahead of order 7 in Private Market C 330).

With reference again to FIG. 2, the Order Router 275 is used to allocate orders placed with ICE 140 among the Internal Exchange 280, and the various external brokers/exchanges 205, 210, 215, 220. The Order Router 275 implements the ICE API 255 such that it can be traded against in manner as can any other ICE 100 component (Internal Exchange 280 or connectivity to an external exchange or broker 205, 210, 215, 220), making it seamless to change a user program from trading using one component to using another.

A Routing Strategy is included in ICE 100 as executable code that implements on a Routing Strategy Interface and provides logic to work quantity in response to user requests. (Here "Routing Strategy" refers to a computer module that implements a routing strategy, where the routing strategy is a concept on how to place the orders for an instrument to be traded.) It handles the allocation of quantity on underlying exchanges as well as generates upward events to reflect changes in the state of worked quantity. Execution Connectors 205, 210, 215, 220 are a connection to the Internal Exchange 280 or another exchange/broker 105, 110, 115, 120. These connections implement the ICE API 255. The ICE system 100 provides connectivity to each external broker/exchange 105, 110, 115, 120 to place orders externally and receive pricing data for the Consolidated Price Feed 265, or can connect via various intermediaries (third party connectivity tools, third party hosting services, common APIs such as the FIX protocol). Orders include a quantity component, which indicates the size of a block for trade execution, or a series of block sizes which are related to a pricing component. The series of block sizes is implemented with the price component in accordance with parameter values of predetermined criteria that is submitted in a stipulation string as part of a routing strategy submitted by the user. Orders also include pricing components which can include market orders, limit orders, or multiple price points that are implemented in accordance with the routing strategy submitted by the user.

Requests to the Order Router 275 to work quantity are formatted as orders referred to as Master Orders. Master Orders 410 are owned and controlled by a single routing strategy, which handles all aspects of the order's lifecycle. The state of a master order is dictated by the orders on the underlying Execution Connectors 205, 210, 215, 220 subject to the policy of the owning routing strategy. Master orders are represented as MktOrder TOC objects that are associated with a MktDefinition object owned by the Order Router.

Figure 4:
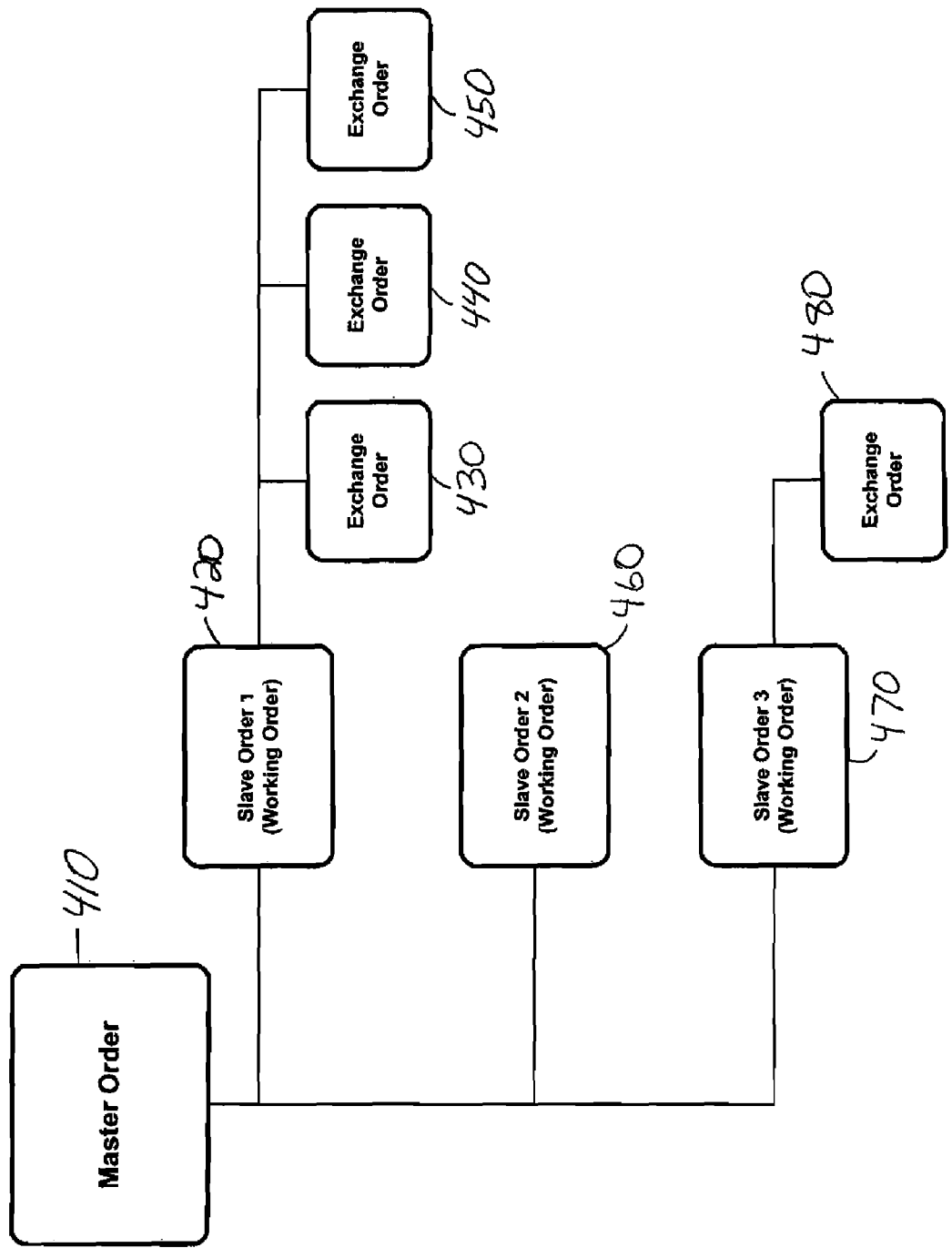
FIG. 4 illustrates an exemplary order relationship in accordance with an embodiment of the invention.

FIG. 4 illustrates an exemplary master order relationship on the Order Router. A single master order 410 is submitted to the Order Router, which is routed to three underlying exchanges by the routing strategy. On the different exchanges, the quantity worked is split into different numbers of exchange orders. Slave order 460 has no current exchange orders and is waiting for a confirmation of an add from the underlying exchange. A routing strategy has the ability to satisfy requests to work a master order by placing Slave Orders 420, 460, 470 on underlying Exchange Connectors 205, 210, 215, 220. These slave orders are owned by a single master order and are represented as MktOrder objects on the MktDefinition of the underlying exchange connector. Slave orders 420, 460, 470 refer to their corresponding master order 410 through the "MasterOrder" field on the MktOrder object. Master orders 410 and slave orders 420, 460, 470 are referred to as Working Orders. Working orders are summary orders that represent quantity being worked on a given exchange connector and provide a stable handle to requested quantity on the underlying exchange connector, regardless of the form that that quantity takes on the underlying exchange. Working orders are represented as MktOrder objects with an "OrderType" field of 'W'.

Exchange Orders represent actual quantity on a given exchange as seen by a Exchange Connector—note that for many reasons the relationship from Working order to Exchange Order does not have to be one to one; on many exchanges, in order to satisfy working order requests efficiently, quantity is be broken up into several orders on the underlying exchange. If an exchange order is created in order to work quantity on a working order, the exchange order object "ParentOrder" field points to the working order that it is linked with. Exchange Orders are represented as MktOrder objects with an "OrderType" of 'E'.

The Order Router 275, built using the ICE API 255, presents a similar interface to other objects in the ICE System 240; it exposes a Procedure based interface for creating and working orders, and creates and updates objects in response to events. These order and transaction objects can be messaged back to the user with various, messaging schemes. Orders worked on the Order Router 275 are manipulated by the working order procedural interface: CreateWorkingOrder, WorkOrder, and ResetWorkingOrder. The Order Router 275 accepts additional routing-strategy specific arguments in the form of text stipulations appended to WorkOrder procedure calls; the allowable values depend on the routing strategy being used to work the master order.

In processing events and requests from users, the Order Router 275 can create MktOrder objects corresponding to master orders being worked on the order router 275, which can be updated on events from the underlying slave orders by the routing strategies. Additionally, MktTransaction objects are published referring to the master order object on events changing the state of the master order. Consumers can watch the aggregate effects of events by listening for updates on the master order objects, or can get more detailed information by watching events on the underlying Slave Working or Exchange Order objects.

Quantity is worked on the Order Router through a Working Order, which is created via a user call to MakeMarket or CreateWorkingOrder, specifying the immutable parameters of the Master Order: the side of the market (bid/offer); the price of the order; and the routing strategy being used to work the order (as the "Strategy" stipulation)

These parameters are fundamental to the Master Order 410, in order to work quantity on the Order Router 275 with a different price a new call to MakeMarket or CreateWorkingOrder must be made, thus, creating a new MktOrder object.

After the creation of a master order 410, its size and current routing parameters can be modified by successive calls to MakeMarket (at the same side and price with the same strategy) or via calls to WorkOrder. These calls can change the current routing attributes (for example, changing the allowed list of routing locations) or the size or action on the order (active versus passive quantity.)

When a master order 410 is no longer being worked by the user (either via becoming completely filled or the size is worked to 0), the order is reset. Resetting a working order 420, 460, 470 reduces the filled size to zero and moves all MktTransactions from that working order to a newly created (closed) historical working order MktOrder object. In addition to automatic resets when orders reach an open size of zero, resets can be made explicitly via a call to ResetWorkingOrder.

The example below shows a set of procedure calls using the CreateWorkingOrder and WorkOrder procedural interface that works quantity on the Order Router 275. This set of calls (with the appropriate object identifiers substituted) could be inserted into an application to work quantity using the Order Router 275. The calls themselves can be implemented using any number of well-known remote procedure call concepts, but in the abstract, they might be considered to look like:

```
PROC   OrderRouter::CreateworkingOrder('00000000000000000001',
       99.96, 'B', 'Strategy=Default)
PROC   OrderRouter::WorkOrder('00000000000000000002', 0, 20, 'A',
       'ExternalMarkets=Broker1,Broker2;Internalshow=Indicative')
```

The first call creates a new working order on the instrument represented by object 00000000000000000001 using the Default Routing Strategy, returning the new working order object 00000000000000000002. That working order object is then used to work quantity on the Internal Exchange as well as between the Broker1 and Broker2 external markets. Successive calls to WorkOrder would modify the current routing parameters and size of the working order created during the CreateWorkingOrder call. When the client is no longer interested in working quantity using this working order, a WorkOrder call can be submitted with a working size of zero to close out any open quantity.

In response to procedure calls, the Order Router 275 creates master order MktOrder objects, which it maintains with the current state of the order in response to events. The individual routing strategies dictate how these objects are updated in response to events and requests, but most routing strategies keep the master order object updated at all times; reflecting all the MktTransactions on that MktOrder object. Additionally, routing strategies publish events as MktTransactions on the master order in response to requests on the master order and events on the underlying slave orders 420, 460, 470.

Routing strategies have the ability to publish the following types of MktTransactions on master orders:

1. User work requests. When user work requests are made, a MktTransaction is added to the master order reflecting the state of the current work request.

2. Fills. Fills on underlying slave orders are reflected via the routing strategy to the Master Order 410; note that multiple fills on slave orders 420, 460, 470 may be summarized as one fill on the master order 410.

3. Errors. Errors during processing of Master Orders 410 are published as TOC MktTransaction objects indicating the error.

4, Resets. Any manual or automatic reset can be accompanied by a reset MktTransaction on the master order 410.

The Order Router 275 exposes a standard ICE API 255 Procedural interface and publishes standard objects or messages into the environment. Thus network applications can interact with the Order Router 275 and its objects. In addition, on specific platforms, the Exchange Connectors 205, 210, 215, 220 may be accessible by a native library which presents language-native objects as well as an interface for interacting with the Order Router 275 and objects. This library provides a level of abstraction and compile-time type safety on top of the underlying return objects as well as additional error checking and handling for procedure calls.

Figure 5:
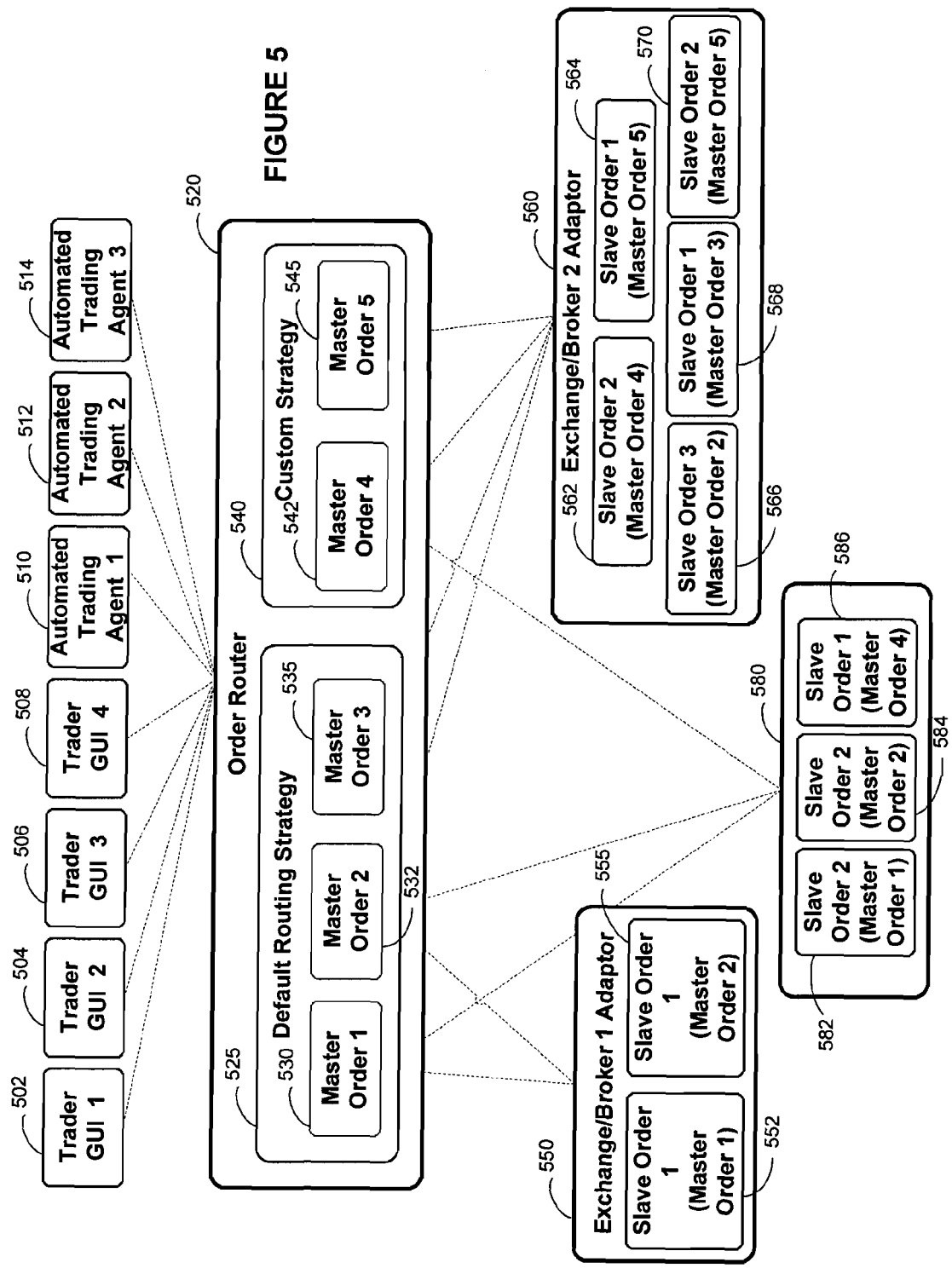
FIG. 5 illustrates multiple strategies interacting with an Order Router in accordance with the embodiment of FIG. 1.

FIG. 5 illustrates multiple end users of an Order Router 520 in accordance with an embodiment of the present invention interacting with different strategies inside the Order Router to place orders on the underlying Exchange Connections, while being able to share internal liquidity across strategies via the Internal Exchange. The Order Router 520 exposes a working order procedural interface with a few additional administrative methods. Note that the Order Router 520 does not implement exchange orders and, thus, does not have an exchange order procedural interface (AddOrder, ModifyOrder and CancelOrder procedures.)

The MakeMarket procedure call is a high-level procedure call that is a combination of the CreateWorkingOrder and WorkOrder procedure-calls. MakeMarket procedure calls create and manipulate a single master order for the given price and side for each user—all MakeMarket calls on the same side and price for the same user manipulate the same master order on the Order Router 520, modifying its size and working stipulations to bring them in line with the current request.

In addition to the standard MakeMarket procedure call arguments, a set of stipulations can be specified. These stipulations specify the routing strategy that should be used to route this order, as well as any additional parameters to that routing strategy for working the order. An empty stipulation string is interpreted as the default stipulations on an initial call, and requests that the current strategy parameters remain unchanged on subsequent calls.

An example MakeMarket procedure call using the Default Routing Strategy 525 would look like:

```
OrderRouter::MakeMarket('00000000000000000001', 13, 99.015625, 'P', 'O', "Strategy=Default;ExternalMarkets=Broker1")
```

In this example, 00000000000000000001 is an identifier of an instrument. This MakeMarket call creates a master order 530, 532, 535 on the Order Router 520 using the Default Routing Strategy 525, which can be provided the stipulation string "ExternalPriorities=Broker1". The order will be a passive offer for size 13 at price 99.015625, as interpreted by the Default Routing Strategy 525.

A call to CreateWorkingOrder begins the lifecycle of a working order and contains all immutable parameters of the order. These parameters cannot be changed via later calls to WorkOrder. In addition to the standard CreateWorkingOrder arguments, an additional text stipulation specifying the routing strategy for this order must be specified. In standard configurations where there is only the single Default Routing Strategy 525 instantiated on the Order Router 520, this stipulation can be omitted—it is assumed to be 'Strategy=DefaultBroker'.

Additional strategy specific stipulations can be added to the CreateWorkingOrder call, which then remains in place unless overridden by a subsequent call to WorkOrder.

The CreateWorkingOrder procedure call returns a newly created working order along with a status code and memo field. After a CreateWorkingOrder call, the newly created working order has no open size, and is prepared for subsequent WorkOrder calls to actually work quantity.

After creation of a master order 530, 532, 535 via CreateWorkingOrder, WorkOrder procedure calls allow manipulation of the order quantity during its lifecycle, allowing changes in size, action and stipulations to the underlying routing strategy. Routing strategies should be built to take advantage of changes in parameters in WorkOrder calls efficiently on the underlying markets—the end-user of the Order Router 520 is free to make WorkOrder procedure calls with changes in parameters assuming the particular routing strategy can effectively compute a transition from one state to another on the underlying markets in such a way that factors such as execution efficiency and queue position are preserved.

Calling ResetWorkingOrder provides a mechanism to request a manual reset of a master order 530, 532, 534. Resets move the filled quantity of the order to zero, scaling the working quantity down such that the open size on the master order is the same before and after the reset. Additionally, all transactions on the master order 530, 532, 534 are migrated to a newly created historical working order (which is created as closed) and a single reset transaction is added to the current working order (which can be the only transaction linked to this master order after the reset). Note that resets on master orders 530, 532, 534 have no effect on the underlying slave orders.

While not strictly a part of the working order procedural interface, the Order Router 520 implements the standard exchange CancelAll and CancelAllExchangeOrder procedure calls, which operate on master orders 530, 532, 534 instead of exchange orders. These methods can be used to cancel all master orders 530, 532, 534 for a given user or on a given side as they are used on other Exchange Connectors. Cancelling a master order cancels all its slave orders, and is equivalent to working the order down to size 0.

In addition to the standard Exchange Connector working order procedures, the Order Router 520 exports two additional administrative procedures used for situations in which the state of the Consolidated Markets System may be known to be inconsistent due to factors such as problems with exchange connectivity or unexpected system failures.

The PanicWorkingOrder procedure call causes an administrative panic on the specified master order—it suspends processing of events on the master order and forcibly cancels all slave orders for the master order on all exchange adaptors 550, 560 on underlying Exchange Connectors. This administrative panic is handled independently of the particular routing strategy used to handle the order and thus is independent of failures in the strategy. Causing a panic on an order is a terminal operation—the order is marked as zombie, and all slave orders are cancelled. Slave order cancellation is retried until a confirmation of the order close has been received from the underlying exchange. After a panic, the routing strategy for the order will no longer process events on the order.

A more global shutdown can be achieved with the PanicRoutingStrategy procedure call, which can be called with a specific strategy name, or no arguments to cause a global panic on all strategies. Performing a strategy panic causes all orders on the strategy to have PanicWorkingOrder called on them. Additionally, no new events are allowed on the strategy—requests for new orders via CreateWorkingOrder or MakeMarket will be rejected with an error status.

The Order Router 520 publishes messages indicating the state of MktOrder and MktTransaction objects in response to user requests and events on the underlying exchange working orders. Master orders 530, 532, 534, 542, 545 from Order Router procedure calls can be determined by looking at the "MktDef" field of the open MktOrder objects—all Order Router master orders 530, 532, 534, 542, 545 are created with MktDefinition objects that have a "Source" field of "OrderRouter." Similarly, transactions on master orders can be identified by cross referencing them with orders via the MktOrder field on the MktTransaction object.

The Order Router master order objects reflect the combined state of the order from all its transactions; the MktOrder state is summarized from all the completed user requests and fills booked by the routing strategy processing the order. A routing strategy 525, 540 is not constrained in how it manages quantities on underlying slave orders, thus, at any point in time quantities on the master order object may not correspond to the user requested quantities from a MakeMarket or WorkOrder call. For example, on strategies for multi-legged instruments or those that allow overfill risk, the amount of quantity being worked on underlying slave orders night not be on the same instrument as the master order, and are not directly comparable to the original request. The MktOrder object corresponding to a master order on the Order Router 520 provides a good indication of the current requested quantity as well as how much has been filled—but does not provide visibility as to how that quantity is being worked.

The Order Router master order 530, 532, 534 is useful for automated trading agents as well as high level summary screens in graphical trading applications by reflecting the current requested quantity and the progress that has been made filling that quantity. Similarly, the MktTransactions published referring to the master order TOC object are high level reflections of events on the underlying slave orders.

Greater information about the state of a master order is contained in the state of the underlying slave orders. Slave orders are the orders and quantities that are being worked on other exchange connectors in the ICE System 100. Slave orders can be determined by enumerating MktOrder objects that have a "MasterOrder" field of the desired master order TOC object and are of the working order type ("OrderType" field is 'W'). This set of orders for a given master order represents the current allocation of quantities across the different exchange connectors.

Slave orders are useful for risk assessment as well as providing additional visibility in how orders are worked across multiple exchanges. MktTransactions on these orders reflect the details of the quantity being worked on the underlying exchange connector and the reaction in the marketplace to those orders. In external exchanges 550, 560 and the Internal Exchange 580, the transactions will reflect the underlying exchange transactions and provide a detailed view on all events relevant to this slave order.

At the most detailed level, MktOrder TOC objects are maintained that mirror orders on the underlying exchanges. These orders can be traced by the "ParentOrder" field, which refers to the slave working order on the exchange. This level of orders provides the known interactions between the underlying exchange and the working order. Orders at this level provide actual information as to the split of quantities across exchange native orders and indicate how the Exchange Connectors worked quantities in response to market conditions and user requests. The split of exchange orders indicates how the exchange quantity has fragmented due to multiple attempts to work quantity up and down on the given exchange while keeping order priority on the underlying exchange.

Orders submitted to ICE 140 may provide Stipulations indicating routing rules that either the order router or various routing strategies may use to route orders. Various types of Stipulations and rules implemented by the order router 520, 275 and other strategies including and in addition to those described above can include:

1. Routing Stipulations designating exchanges that an order must be placed on, may be placed on, or must not be placed on. Orders may also arrive without any Routing Stipulation, indicating the Order Router 520, 275 is free to automatically place the order as it best sees fit using a designated Order Router Strategy 525, 540.

2. Price Modification Stipulations indicating price modifications that are applied if the order is placed on certain exchanges. For example, an order may indicate that the Internal Exchange may be sent a price that is ¼ tick better than the price sent to any external exchange. Orders without Price Stipulations indicate that the same price is to be used on all valid exchanges.

3. An All-In-Cost Commission Stipulation indicates that the Order Router 520, 275, or its strategies 525, 540, are to calculate the commission that can be charged by each exchange when the order is placed on that exchange, and include that commission in the price sent to the exchange. For example, if a bid is submitted to the Consolidated Exchange 295 and is to use All-In-Cost, then the bid is placed at a valid price level on each exchange such that the actual price paid including each exchange's commissions is better than or equal to the price the order stipulated for each exchange.

4. Placed-Size Stipulations indicate the maximum and minimum size that is allowed to be placed on a certain exchange at any given time. For example, an order may indicate that one external exchange is to only be sent a maximum size of 2 MM at any given price even if the order's total size is 10 MM. Orders without Placed Size Stipulations have their full size placed on all valid exchanges. Orders may also indicate minimum sizes that are allowed to be placed on each exchange. If the order has less size to fill than the minimum size that can be placed on the exchange, then the order is not placed on the exchange at all.

Any stipulations may have default values configured to take effect when orders do not explicitly indicate the given stipulations. These default values can also be configured such that an order cannot override the default value (for example, an order may not be able to stipulate a maximum size for Broker1 greater than the default maximum size allowed for Broker1).

The Order Router 520, 275 uses specific rules to determine how to allocate orders:

If an incoming order has any "must be placed on" Routing Stipulations, the Order Router 520, 275 sends that order to the specified exchanges. If the order names a specific Order Strategy, the order is sent to that Order Router Strategy 525, 540.

If an incoming order has any "may be placed on" Routing Stipulations or does not have any stipulations at all, the Order Router Strategy can use a designated Order Router Strategy 525, 540 (or the default Order Router Strategy 525 if none is specified in a stipulation on the order) to send the order and the appropriate size to each applicable exchange. If the Order Router Strategy 525, 540 later decides to reallocate sizes, the Order Router 520, 275 and Strategy 525, 540 responds accordingly on each exchange.

Any partial or complete fills for the order from any exchange results in the Order Router 520, 275 and Strategy 525, 540 canceling the amount of the fill from all the other exchanges (unless they are maxed out at their Placed Size Stipulation) and indicating the amount of the fill on the main order. This continues until the order has had its full size filled or is cancelled.

Orders sent to the order router may also stipulate Fill or Kill, and Minimum Size stipulations. If an exchange supports the given stipulation, it can be used when the order is sent to the given exchange. If an exchange does not support the given stipulation, the order can not be placed on the given exchange. The Order Router 520, 275 may be configured to pass commissions charged by external exchanges through to users of ICE 240.

Many Order Routing Strategies 525, 540 use the same common set of functionality to perform routing tasks, such as placing an order on an exchange, pulling an order from an exchange, connect master orders 530, 532, 534 to slave orders 552, 555, create slave orders, cancel slave orders, and so on.

The stipulations described above describe general stipulations that might be used by the order router and its strategies. A specific implementation of an order router strategy using specific stipulations is described below. The Default Order Router Strategy 525 is an implementation of a real-time dynamic exchange order routing strategy. The strategy serves at least two purposes. First, a production quality implementation of an order router strategy which attempts to fill user orders across multiple exchanges by judging current market conditions. Second, a sample routing strategy which can serve as a template for customer built routing strategies.

In addition to managing slave orders across multiple exchanges, the Default strategy publishes information to the Internal Exchange 580 about available liquidity, facilitating internal trades as well as taking advantage of internal liquidity when it is available. The Default strategy 525 is highly configurable on a per-request basis. By working orders with different input stipulations, the actions of the Default strategy 525 change to match the user's current request. The Default Order Routing Strategy 525 is currently configured for cash exchanges. However, as will be understood by a person of ordinary skill in the art, the strategy can be implemented as a working strategy for futures exchanges without undue experimentation.

The Order Router 520, 275 presents an end-user interface similar to that of the other Exchange Connectors; via MakeMarket, CreateWorkingOrder and WorkOrder cabinet procedure calls. Orders can be created on the Order Router, 520, 275 and instructed to work quantities using a specified Routing Strategy 525, 540. If the Strategy stipulation on a MakeMarket or CreateWorkingOrder call is set to "Default", the order submitted to the Order Router is worked using the Default Routing Strategy 525.

In addition to the typical working parameters to a MakeMarket or WorkOrder call (price, side, quantity, action), the Default Order Routing Strategy 525 takes input as a set of semi-colon delimited stipulations of the form "key=value". An example stipulation string on a MakeMarket call would look like:

```
Strategy=
Default;OverfillRiskFactor=0;ExternalMarkets=Broker1,Broker2; Internal
Show=Indicative; InternalFillWaitSeconds=10;
ExternalShowExchangeSize=5;ExternalShowTotalSize=7
```

This stipulation string indicates that the order should be worked using the Default Routing Strategy 525 with no overfill possible using Broker1 and Broker2. Passive working on underlying exchanges is limited to piece sizes of five (5) (in the Notional Amount of the underlying instrument) regardless of the order size, and the total external quantity for this order is limited to seven (7) at any one time. This order is also working on the Internal Exchange 580. When there is no crossing order on the internal exchange, the strategy places an indicative order to publish the available size internally. If a crossing order does appear, the strategy firms up the indicative order, but waits no longer than ten (10) seconds for a fill before giving up and continuing to work on Broker1 and Broker2.

The Default Routing Strategy 525 is highly configurable, and accepts the following parameters to modify its decision-making logic when working a particular order. Stipulations on subsequent MakeMarket and WorkOrder calls on the same working order overwrite the stipulations currently in effect, putting the new routing parameters in effect. The full list of allowable stipulations is available in Table 5.

TABLE 5

Supported stipulations on orders routed using the Order Routing Strategy

| Name | Type | Description | Example(s) | Default Value |
|---|---|---|---|---|
| OverfillRiskFactor | Double | A multiplier of the current open size of the maximum amount of overfill risk that is allowed, | 0 is none, 0.5 is up to a 50% overfill (ie, 1.5 times the current open size), 1.0 indicates the possibility of being filled for up to two times the current open quantity. | 0 (no overfill) |
| ExternalMarkets | String (Comma delimited string list of | A prioritized list of the external exchanges that this order | "Brkr1, Brkr2" to allow the routing strategy the ability to route between Broker1 and Broker2. The empty list ("") disables external routing. | " " (no external routing) |

TABLE 5-continued

Supported stipulations on orders routed using the Order Routing Strategy

| Name | Type | Description | Example(s) | Default Value |
|---|---|---|---|---|
| | Exchange names.) | is able to be routed to, earlier entries take precedence over later ones. | | |
| ExternalShowExchangeSize | Double | The maximum quantity that will be placed externally on a single exchange. | For an order of size 10, a value of 5 would work quantities in chunks of up to 5 on a single exchange. | Full order size |
| ExternalShowTotalSize | Double | The total quantity that will be placed externally simultaneously on this order. | A value of 3 on a size 10 order would restrict more than 3 quantity from being placed across all exchanges listed in ExternalMarkets, where the quantity on each exchange is limited by ExternalShowExchangeSize. | Full order size |
| InternalShow | String {FirmOnly, Indicative, Never} | Indicates how this order will be worked on the Internal Exchange 580. | "FirmOnly" will only show size as firm on the internal exchange when allowed via overfill restrictions. "Indicative" will show quantity not placed at crossing locations as indicative on the internal exchange. "Never" indicates quantity will never be placed on the internal exchange for this order. | "Indicative" |
| InternalFillWaitSeconds | Double (time in seconds) | Indicates on a possible internal exchange fill, how long the order is willing to wait (in seconds) for that fill to occur. | 0 indicates that this order will not react to any indicative order on the internal exchange. Any non-zero number will be the amount of time that this order will wait when waiting for an indicative order on the internal exchange to be firmed up for trading. | 30 seconds |

The Default Order Routing Strategy 525 separates processing into two phases, first attempting to allocate quantity to locations that are likely to fill immediately (Crossing Locations), and then allocating any remaining quantity to locations that it believes will put quantity in priority order to fill when trading next begins (Idle Locations). The strategy chooses prices that are as aggressive as allowed by the given exchanges pricing requirements (for example, an order not placed on a tick boundary would be truncated to the next least aggressive tick allowed by the exchange, while being placed at the exact price on the Internal Exchange 580). On exchanges that do not allow orders to cross the market, the least aggressive order that crosses the opposite side is placed.

On response from events from exchanges (price updates, markets coming online and offline) as well as user requests, the Order Routing Strategy 525, 540 reevaluates its internal rules, and attempts to work orders on the underlying exchanges based on rules. Note that the Order Routing Strategy 525, 540 only routes orders to exchanges listed in the ExternalMarkets stipulation submitted to the order. Additionally, the Order Router Strategy 525, 540 only places active quantity on a slave order when working active quantity on the master order.

A Crossing Location for a master order 530, 532, 534, 542, 545 (the order placed with the Order Router 525) is defined as an external market on an exchange specified in order's ExternalMarkets stipulation list in the instrument of the master order where:

1. The market is not trading, the master order quantity is active, and the price of the master order crosses an order on the opposite side.

2. The market is trading and the master order is on the passive side of trading and crosses the trading price.

3. The market is trading, the master order quantity is active, the order is on the active side of trading and crosses the trading price.

For each crossing location, there is a set of price levels (at least one per crossing location) that are crossing. Crossing Levels are the price levels of a market where there exists some order on the opposite side that this order crosses. The routing strategy works quantity on all crossing levels across all eligible crossing locations, attempting to work the maximum net quantity on the opposite side of the master order at each crossing level. The net quantity on the side of a level is defined as the quantity available on that level's side after the common size on both sides of that level is removed. The routing strategy naturally prefers more aggressively priced crossing levels over less aggressively priced ones. When multiple crossing levels are at the same price, preference is given to exchanges earlier in the ExternalPriorites list specified for the order.

If the full order quantity is not placed across all crossing locations, the remaining quantity is worked on one of the crossing locations. There are several options for how to distribute this remaining quantity:

1. Place all remaining quantity on the least aggressive crossing level on the first crossing location in the ExternalMarkets list.

2. Place all remaining quantity on the least aggressive crossing level at the crossing location with the least net quantity on the same side as the master order.

3. Split the remaining quantity across all crossing locations proportionally, increasing the quantity at the least aggressive crossing level at each location.

The Default Order Routing Strategy 525 places all remaining quantity on the least aggressive crossing level on the first crossing location in the ExternalMarkets list. Note that the order's OverfillRiskFactor, ExternalShowExchangeSize and ExternalShowTotalSize stipulations do not affect placement of quantity at active locations.

If there are no crossing locations, then the Default Order Routing Strategy 525 attempts to place quantity at places that are likely to become available for matching in the near future. This is accomplished by trying to maximize the order's location in an exchange's queue such that when trading begins, the order is likely to be first in line to be filled. The strategy uses the following criteria to order available idle locations:

1. Choosing markets specified in ExternalMarkets that have no size at the price level of the order. Thus, giving a slave order priority via being the first order at the level. Multiple locations are chosen via their location in the ExternalMarkets stipulation list.

2. If no empty levels are available, the strategy joins the size already on a market. Similar to that of the crossing locations, ordering remaining locations can be based on the order of the location's exchange in the order's ExternalMarkets list; or based on the size at the price level of the order on each exchange, preferring smaller sizes to larger ones.

The Order Routing Strategy 525 prefers locations whose exchange is earlier in the order's ExternalMarkets list. Unlike quantities at crossing locations, which is limited to the total open quantity, the total quantity placed at idle locations is increased by the current order's OverfillRiskFactor times the current open size, referred to as the overfill-adjusted quantity. For example; if an order for 10M has an overfill risk of 0.5, there will be 10M+(10 M*0.5)=15 M available for placing at idle locations, subject to the constraints of the order's ExternalShowTotalSize and ExternalShowExchangeSize stipulations.

The order router 520, 275 iterates through the available idle locations in order, working the maximum quantity possible at each idle location within the following constraints:

1. Never placing more than the current open size on a single exchange.

2. Never placing more than the order's ExternalShowExchangeSize on a single exchange.

3. Never placing quantity such that the total external quantity exceeds the order's ExternalShowTotalSize.

In addition to the logic for routing orders externally, the Default Order Routing Strategy 525 takes advantage of internal liquidity via placing orders on the Internal Exchange 280, 580 and watching for possible matches and reacting with firm orders. If an order's InternalShow stipulation is not set to "Never", the Default Order Routing Strategy 525 attempts to take advantage of the Internal Exchange 280, 580 by placing orders to publicize available quantity or take advantage of liquidity.

The Default Routing Strategy 525 has at least two different ways of advertising quantity on the Internal Exchange 280, 580, either by just allocating unused quantity from idle locations to provide firm quantity on the internal exchange, or by placing indicative orders to inform others about the presence of liquidity currently being worked at idle locations. In either situation, the Default Routing Strategy 525 pulls orders from external markets in order to take advantage of internal liquidity (if needed to satisfy overfill restrictions.)

The two types of internal working differ in the way that they show internal quantity: if an order's InternalShow stipulation is set to "FirmOnly", that order will only show firm quantity on the internal exchange 280, 580, either because quantity could not be allocated externally, or because of an impending cross on the internal exchange 280, 580. If an order's InternalShow stipulation is set to "Indicative", the order's full open quantity is always shown as quantity on the internal exchange 280, 580 when the order is working quantity at idle locations, split between the firm portion that can be placed on the internal exchange 280 due to external constraints and remaining open quantity.

Orders with InternalShow stipulations set to either "FirmOnly" or "Indicative" watch the Internal Exchange 280, 580 for crossing orders, and attempt to match them by reducing their quantity at crossing locations or idle locations (if necessary to be within overfill limits) to match the quantity shown on the internal exchange 280, 580. In many ways, the Internal Exchange 280, 580 can be treated as if it were an external exchange 550, 560 at the front of the order's ExternalMarkets list when it is a crossing location, and at the end of the order's ExternalMarkets list when it is an idle location, with the following differences:

When treated as a crossing location, only the exact quantity needed to fill the crossing order is placed on the Internal Exchange 280, 580, No excess quantity is worked on the internal exchange when it could be worked on another crossing location. Additionally, quantity is worked at idle locations while the internal exchange is being worked as a crossing location if there are no other crossing locations that could receive quantity.

When treated as an idle location, no external limits are followed, i.e., the Internal Exchange 280, 580 are not subject to an order's ExternalShowTotalSize and ExternalShowExchangeSize limits.

In order to provide some guarantees that an order is not leaving firm quantity on the internal exchange 280, 580 without filling when that quantity could be placed elsewhere, there is a restriction on the time an order will wait on the internal exchange 280, 580 for a possible trade to be completed. The InternalFillWaitSeconds stipulation sets an upper bound on the amount of time that the order waits for a fill after placing a firm order on the internal exchange 280, 580 in response to a crossing order. If an internal cross situation causes the order router to place a firm order on the internal exchange 280, 580 when that quantity could be placed elsewhere, the routing strategy 525, 540 waits up to the order's InternalFillWaitSeconds time before reevaluating the current order and placing quantity elsewhere. This timeout scenario can happen for several reasons, most commonly because an order on the internal exchange 280, 580 cannot be firmed up due to delays in canceling external orders. The InternalFillWaitSeconds stipulation attempts to limit the amount of time an order could be penalized by taking advantage of internal liquidity.

An example of this concept can be explained by considering a case where Master Order 01 is placed on the OrderRouter with no overfill (OverfillRiskFactor=0) and is allowed to trade on Broker1 (ExternalMarkets=Bkr1), with no external limits where InternalShow=Indicative. The Default Routing Strategy 525 sees that there are no orders that cross it on the internal exchange, and works the full quantity of the order passively on Broker1. Additionally, it places an indicative order for the full order's size on the internal exchange 280.

However, Master Order 02 is placed on the OrderRouter 520, 275 with no overfill (OverfillRiskEFactor=0), and is allowed to trade on Broker2 (ExternalMarkets=Broker2). Master Order 02 is specified with InternalShow=Indicative and InternalWaitFillSeconds=5. Master Order 02 is at the same price and on the opposite side of Master Order 01, and crosses with Master Order 01. When evaluating the state of all markets, while it exactly matches the indicative order on the internal exchange 280, 580 for Master Order 01, there is also an order on Broker2 that it could cross with. Preferring internal liquidity over external liquidity, a firm order for Master Order 01 is placed on the Internal Exchange, 280, 580, and starts a timer for 5 seconds.

Master Order 01 sees the change in the Internal Exchange 280, 580 due to the firm slave order from Master Order 02. Master Order 01 reduces its quantity on Broker1 to be within overfill limits and places a firm matching order on the Internal Exchange 280, 580.

If the order router had been unable to cancel the slave order for Master Order 01 on the internal exchange 280, 580 within the 5 second window of the InternalWaitFillSeconds stipulation of Master Order 02, the order router 520, 275 would have pulled the slave order of Master Order 02 on the internal exchange 280, 580 and placed it on Broker2. The order router 520, 275 would not revisit the decision to match with Master Order 01 until Master Order 02 was no longer being worked on crossing locations, and was thus unlikely to immediately fill anywhere. This re-visitation constraint strikes a good balance between taking advantage of internal liquidity when possible, while not penalizing orders that take advantage of internal liquidity to the point where they are unable to take utilize liquidity in the external market.

The Order Router 520, 275 connects to the external exchanges and brokers 105, 110, 115, 120 through Execution and Pricing Connectors 205, 210, 215, 220. The Exchange/Broker Execution and Pricing Connectors 205, 210, 215, 220 are responsible for negotiating with each exchange specific client API to place the orders on the different exchanges and gather live pricing data. These Connectors may provide a uniform API/protocol to the Order Router 275, 520 to abstract the system from the mechanics of the individual exchanges.

Connectors allow for multiple orders from the order router 275, 520 to be combined into a single order sent to a given broker/exchange under a single login, to be sent as different orders under a single login, or to be sent as different orders under different logins as desired by a user.

Any connection or other failures with external exchanges (or system administrator notifications that an external exchange is "stale") removes the failed exchange from the Order Router's 275, 520 list of valid exchanges and the Consolidated Price Feed.

Broker/exchange pricing data from non-tradable exchanges or other pricing sources 235 can also be combined into the Consolidated Pricing Feed 265 to provide a central clearinghouse for market price data. These prices are marked as "untradeable" in the price feed.

ICE system 100 provides a normalized interface across various exchanges, broker platforms, ECNs, and the Order Router 275, 520. An Exchange Connection process provides the interface between the regularized market connector interface and an underlying custom broker system or ECN. The differences across the different underlying exchange, ECN and broker interfaces are quite substantial. To manage these differences, Exchange connectors make use of a layered functionality approach and support different degrees of interface normalization. In one embodiment each Exchange Connector supports both an Exchange Order API and a Working Order API.

The Exchange Order API layer is closest to the semantics of the underlying system. This interface and set of objects closely mirrors the underlying system's behavior. As a result some of the idiosyncrasies of the underlying system are exposed to the user. Necessarily, the Exchange Order API is more complex as the details of the underlying systems are exposed. Using the Exchange Order API will require users to account for differences in the semantics of the underlying exchanges.

The Exchange Connector can also support the Working Order API layer which normalizes these differences with regard to order placement and management. The Working Order API is built on top of the Exchange Order API and accounts for the underlying semantic differences across the exchanges and abstracts these differences from the user. Most users should use the Working Order API as it unifies and simplifies programming against all the exchanges.

The Working Order API manages a unified single working order for the user at a given price. Through the Working Order API, exchange connectors maintain precise lifecycles of internal orders independent of the lifecycle of orders on the underlying exchange API. The adaptor manages the appropriate mapping between the working order and the underlying exchange orders. In some cases this means mapping many different exchange orders to a single working order. This approach allows the user to control the lifecycle of the working order as needed.

The Working Order API includes the following API calls: MakeMarket; CreateWorkingOrder 612; WorkOrder 626; CloseWorkingOrder; and ResetWorkingOrder The Working Order API also creates and manages MktOrder and MktTransaction objects specifically related to working order management. These objects are denoted with and OrderType value of 'W'.

The Lifecycle of a working order is managed by Exchange Connectors 205, 210, 215, 220. Working Orders are long-lived objects that are held open throughout a running instance of a Exchange Connector 205, 210, 215, 220. Most Working Orders have an outstanding size of 0 indicating that they are idle. When the connector is shut down all its working orders are closed.

Working Orders can be either active or historical. An active Working Order provides a stable handle to the outstanding size placed on the exchange at a given price. Programmers can use this handle to manipulate the order's size up and down. The order's WorkingSize is controlled by the user through either the WorkOrder or MakeMarket API calls. The size can increase based on a user's request, and rarely decreases without a user's request. The size can decrease when the underlying exchange independently cancels the order, or the adaptor itself is shut down. The reset process is the mechanism which turns active orders into historical orders. Once the order's WorkingSize=FilledSize and OpenSize=0 the order can be reset. During reset the adaptor will archive the currently filled size or the active order to a historical order and reset the active order's WorkingSize, FilledSize and OpenSize all to 0.

Figure 6:
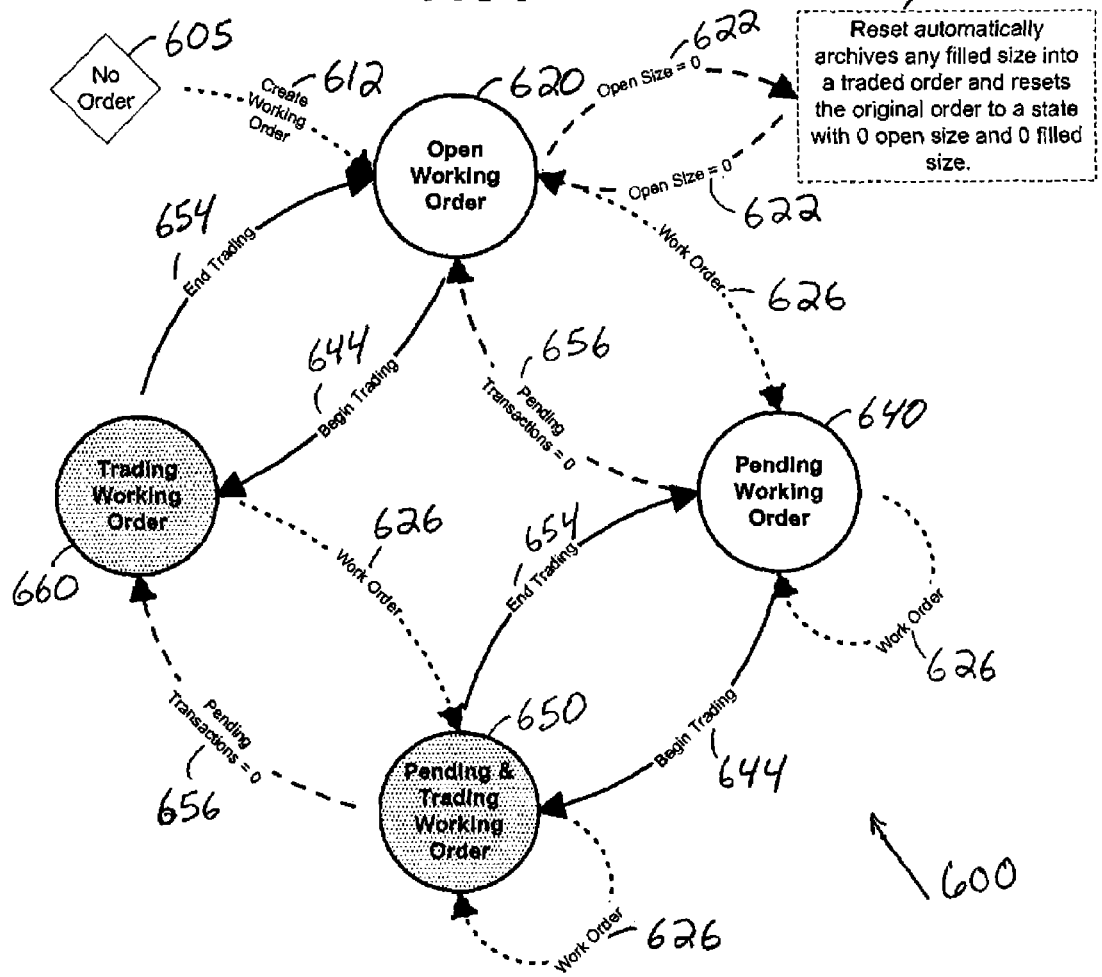
FIG. 6 illustrates a process of the lifecycle of working orders in accordance with an embodiment of the invention.

FIG. 6 illustrates a process 600 of the lifecycle of working orders in accordance with an embodiment of the invention. State 605 is a condition where there is no order in existence. A user creates, step 612, a working order utilizing the end-user interface to transition the system to the Open Working Order state 620. While the system is in state 620, conditional transition 622 determines if the open order size equals zero, which indicates that an order was completely filled. If conditional transition 622 determines that an order was filled, the system automatically archives the filled size into a traded order, step 630, and resets the original order to a state having a zero size and a zero filled size. Once the system executes step 630 and conditional transition 622 determines there is an order with a zero open size, step 630, conditional transition 622 reverts the system back to the Open Working Order state 620.

At the Open Working Order state 620, the user can generate a Work Order at transition 626 causing the system to transition to the Pending Work Order state 640. Alternatively, the user can begin trading at transition 644 to result in the Trading Working Order state 660. At Pending Work Order state 640, the user can enter another work order at user transition 626. While at Pending Work Order state 640, the exchange can begin trading at transition 644 resulting in the Pending & Trading Working Order state 650. The user also has the option of entering another work order at transition 626 while the system is in the Pending & Trading Working Order state 650. The exchange can shift the system from the Pending and Trading Working Order state 650 back to the Pending Working Order state 640 via transition 654. From Pending & Trading Working Order state 650 the system can transition to the Trading Working Order state 660 via conditional transition 656. For example, this can occur when the pending transactions equal zero. Once the system is at the Trading Working Order state, the user can also enter a work order 626 causing the system state to revert back to the Pending & Trading Working Order state 650.

Alternatively, the system can proceed through the state diagram counterclockwise from the Open Working Order state 620. This process is not user controlled but is initiated by the exchange when the exchange begins trading at 644 and the system transitions to the Trading Working Order state 660. The exchange can also transition the system back to the Open Working Order state 620 by ending the trading at 654. This process can repeat itself in either direction, depending on whether the exchange initiates the transitions or the user initiates the transitions. A working order makes use the fields shown in Table 6 on the MktOrder object to maintain its state.

TABLE 6

| Field | Description |
| --- | --- |
| OrderType | The OrderType field will always be 'W' for Working Orders. The primary way to identify Working Orders is by restring TOC Queries according to OrderType='W'. |
| ParentOrder | The ParentOrder field will always be NULL for a working order. |
| MasterOrder | The MasterOrder field is a user-controlled field and can be used by external processes to organize Working Orders according to business needs. The Order Router makes use of this functionality to manage many Working Orders as a single entity controlled by a trader. To set the MasterOrder field on a Working Order specify the stipulation Masterorder=<object Id> when creating the working order. |
| InternalOrderId | Exchange Connectors will automatically generate a new InternalOrderId for each working order. |

TABLE 6-continued

| Field | Description |
| --- | --- |
| | This identifier will remain on the order for the life of the order. |
| ExternalOrderId | Since a Working Order is an abstraction of one or more underlying Exchange Orders, Working Orders do not have ExchangeOrderIds. This field will always be empty for Working Orders. |
| State | Indicates the State of the Working Order. All orders (Working and Exchange) support the same state model. Active Working Orders will always have state O for open. Historical Working Orders will always have state D for done. |
| WorkingSize | The WorkingSize describes the target size for the order. This is the size the trader is 'working' towards. When a Working Order is the summary of many Exchange Orders the WorkingSize will be the total size of all the Exchange Orders. For markets which support workup, WorkingSize and OffWorkingSize are used track the entire outstanding size at a given price. The OffWorkingSize field is only used during trading for markets which support workup and locked markets. See Section 2.1.2 for details on how OffWorkingSize and WorkingSize interact during trading. |
| OpenSize | The OpenSize of a Working Order describes the size that has not yet been filled for the order. As WorkingSize and FilledSize, the OpenSize will be a summation of the OpenSize of any underlying Exchange Orders. |
| FilledSize | The FilledSize of a Working Order is the total filled across all the underlying Exchange orders. |
| OffWorkingSize | The OffWorkingSize field is only used during trading for markets which support workup and locked markets. OffWorkingSize will contain any size being worked passively on the active side of the market. |
| OffOpenSize | Similar to OffWorkingSize, OffOpenSize is used during trading state and workup to indicate any open size on the passive side on the actively trading market. |
| TradingState | When a market supporting working begins trading all orders in the market (both Exchange and Working)will be marked with the appropriate trading state. |
| ReplacedBy | For active Working Orders the ReplacedBy field will be null. For historical Working Orders, this will contain the current active working order which replaced the historical order during reset . . . |
| ReplacedBySeqNo | Every time a working order resets a sequence number is incremented. During the reset process the historical order is created and the ReplacedBy field is filed in with the active Working Order. At the same time the ReplacedBySeqNo field is filled in with the sequence number of the recently reset working order. |

Each working order supports a reset operation. Working order can be manually or automatically reset. The ResetType stipulation indicates which resetting mechanism is used. By default, order resetting is automatic but can be configured per-order according to the following stipulations:

ResetType=Automatic
ResetType=Expicit

Only active Working Orders can be reset and only under certain conditions. If the order's reset type is automatic the adaptor automatically resets the order when appropriate. If the reset type is explicit then the user can reset the order by calling the ResetWorkingOrder API call. Working Orders can be reset only under the following conditions:

1. No underlying Exchange Order is currently in the trading state.
2. All underlying exchange orders are either completely open (WorkingSize=OpenSize) or completely closet (WorkingSize=FilledSize)

Reset attempts at any other time will be rejected.

During order reset, the currently order state is archived to a historical Working Order. The reset operation moves all completely filled exchange orders off of the active Working Order and places them on the newly created historical Working Order. The current working order retains its existing InternalOrderId. A new historical InternalOrderId is generated and placed on the historical order. Historical InternalOrderIds have the format <original order id>.<reset revision>.

The following is an example of a completed fill reset:

---

[Initial Order State]

InternalOrderId = W00001
WorkingSize = 10
OpenSize = 0
FilledSize = 10
TradingState = ' '
Following reset operation
[Reset Order]

InternalOrderId = W00001
WorkingSize = 0
OpenSize = 0
FilledSize = 0
[Historical Order (newly created)]

InternalOrderId = W0001.2
WorkingSize = 10
OpenSize = 0
FilledSize = 10

---

The following is an example of a partially filled reset:

---

[Initial Order State]

InternalOrderId = W00002
WorkingSize =10
OpenSize = 3
FilledSize = 7
TradingState = ' '
　　(underlying exchange order 1)
　　　　InternalOrderId=EX0001, WorkingSize=7, FilledSize=7
　　(underlying exchange order 2)
　　　　InternalOrderId=EX002, WorkingSize=3, FilledSize=0
Following reset operation
[Reset Order]

InternalOrderId = W00002
WorkingSize = 3
OpenSize = 3
FilledSize = 0
TradingState = ' '
　　(underlying exchange order 1)
　　　　InternalOrderId=EX002, WorkingSize=3, FilledSize=0
[Historical Order (newly created)]

InternalOrderId = W00002
WorkingSize = 7
OpenSize = 0
FilledSize = 7
TradingState = ' '
　　(underlying exchange order 1)
　　　　InternalOrderId=EX0001, WorkingSize=7, FilledSize=7

---

Working Orders can be created by a call to CreateWorkingOrder 612. Following instantiation the user can then modify the outstanding order size by a call to WorkOrder 626. At some point the order is completed and identified by pending=false, OpenSize=0, and TradingStatus=' '. Assuming the order was placed with ResetType=explicit, at this point the user can reset the order or alternatively close the order through a call to CloseWorkingOrder. CloseWorkingOrder marks the working order with Status=D and disallows further operations on that order.

MakeMarket is a high-level function to interact with an Exchange Connector 205 210, 215, 220 encapsulating Add, Cancel and Modify functionality. MakeMarket intelligently places the correct lower level operation required to be working the size indicated as its parameter. It allows users to specify the size they wish to work on the market independent of the current size they may be current working or have already filled.

For example, a call to MakeMarket with a size of 50 and then with a size of 20 first issues an AddOrder command to add the size of 50, and then depending on the exchange and what it supports, issues a modify absolute to 20. MakeMarket allow stipulations to be set on a Working Order.

The CreateWorkingOrder call 612 instantiates a new working order on the instrument, side, and price specified. No actual order is placed on the exchange until the user calls WorkOrder 626. CreateWorkingOrder 612 simply creates the reference to the order object which can then be manipulated by subsequent WorkOrder 626 calls. CreateWorkingOrder 612 allow stipulations to be set on a Working Order.

WorkOrder 626 changes the outstanding size of an existing Working Order. Based on the current and desired outstanding size, WorkOrder 626 places and/or cancels the underlying Exchange Orders to reach the target. WorkOrder 626 behaves intelligently when increasing and decreasing size by attempting to preserve advantageous time-priorities of different underlying Exchange orders. It avoids cancel/replace behavior and instead manages multiple underlying orders as a single unit. Similarly, when canceling orders or reducing size, orders are canceled in reverse so that the last Exchange Order placed is the first Exchange Order canceled. Attempts to close and remove the WorkingOrder 626. Only Working Orders with 0 OpenSize can be closed. If for any reason the order cannot be closed an error will be indicated to the user.

Attempts to reset the working order as defined by the reset operation. Users who submit orders with ResetType=Explicit can call this function to explicitly perform reset operations.

The ICE API 255 is accessed through Remote Procedure Call functionality. Upon startup and initialization, an Exchange Connector registers the following Remote Procedures for user applications to call:

---

AddOrder
CancelOrder
CancelAll
ModifyOrder
CancelAllExchangeOrders

---

AddOrder adds a new order to the exchange at a specified price and size for the calling user. The exchange user under which the order is placed is determined by the TOC user to exchange user mapping maintained as part of the system configuration. Depending on the exchange, add order may behave in different ways when a previous order is already sitting on the market. For exchanges which do not support multiple orders at the same price for a given connection, an add order automatically is converted by the adapter into a modify order statement. This operation attempts to increase the size of the existing order by the added amount. For those exchanges in which multiple orders at a give price can be submitted, the add order function adds multiple different orders to the exchange. AddOrder allows stipulations to be set on a Working Order.

CancelOrder cancels one or more existing orders on the exchange. CancelOrder indicates a desire to cancel the entire size of the exchange orders identified. To cancel only a portion of an orders size execute a ModifyOrder procedure indicating a downward size (either absolute or delta). Although an Exchange Connector 205, 210, 215, 220 attempts to cancel the entire outstanding order size, due to exchange semantics, this is not always possible. Therefore, CancelOrders calls may result in only partial cancels. This can happen, for example, when trying to cancel an order within an exchange hold-in time, or if fills occur while the order is being canceled. The actual canceled size will be indicated on the resultant transaction.

Users can only cancel their own orders through the CancelOrder procedure call. To cancel other users' orders, the CancelAllExchangeOrders procedure call. CancelOrder can cancel multiple individual orders by specifying an array of orders to cancel. Use the CancelAll function to specify a more general class of orders to cancel.

CancelAll cancels one or more existing orders on the exchange based on the orders' context within the exchange. To cancel individually specified orders use the CancelOrder procedure. CancelAll indicates a desire to cancel the entire size of the exchange orders identified. To cancel only a portion of an orders size execute a ModifyOrder procedure indicating a downward size (either absolute or delta). CancelAll attempts to cancel orders for the calling user. Other users' orders will not be canceled. Use CancelAllExchangeOrders to do so.

ModifyOrder allows users to modify the state of existing orders. Orders can be modified in absolute terms or in delta terms. Only one absolute modification is permitted at a given time. All subsequent modification requests following an absolute modification fail (via error transaction) until the first absolute modification is completed either via confirmation or error from the underlying exchange. Multiple delta modifications can be pending at a single time.

Stipulation Structures are a flexible list of named, typed, values passed in to the MakeMarket, CreateWorkingOrder 612 AddOrder and ModifyOrder procedures as a string. TocValue parsing and type checking functionality ensures type correctness at runtime. For example, the string stipulation list 'FillOrKill=True,HiddenSize=20' is parsed into two stipulations—the first a Boolean indicating FillOrKill and the second a double value indicating hidden size on the order.

The market price objects are used by the price feed side of the exchange handlers. These objects are broadcast by the Exchange Connectors to indicate the state of the external market as it ticks. The MktPicture object is used to transfer market price information. It represents the state of a market on an exchange at a given time. The MktPicture object contains fields for the price stack (on bid and offer sides), trading state (buy and sell order queues) and trade information.

The MktPicture object contains market information for both trading and not-trading markets. During trading markets the Buy and Sell side market participants are indicated as the first level of the order stack. For example consider the following market and subsequent active order:

Inactive market

| 100-24+ | −246 | 30 × 10 |
| 100-24 | −25 | 50 × 50 |
| 100-23+ | | 10× |
| | | Order: SELL 10 at 100-24+ |

Trading market

| 100-24+ | −24+ | 10 | |
| 100-24+ | −24+ | 20 × 0 | ← The trading state activity is duplicated at level 0 of the market picture |
| 100-24 | −246 | 50x10 | |
| 100-23+ | −25 | 10 × 50 | |

TABLE 7

Trading Constraints

| Constant Value | Description |
|---|---|
| ' ' | An empty space indicates that the market is not trading. |
| 'H' | An 'H' indicates a HIT or that the market is trading down. |
| | A 'T' indicates a TAKE or that the market is trading up. |

In order to efficiently use network bandwidth, Exchange Connectors 205, 210, 215, 220 employ a delta algorithm to only broadcast changes between MktPicture objects. When MktPicture consumers first query for MktPicture object the full object is transmitted to the client. From that point on, only changes are transmitted. This greatly reduces overhead and improves client, Connector, and general network performance.

Consumers of MktPicture objects, therefore, are required to maintain a cache of the MktPicture object of interest. This is best achieved by using a TOC InMemTable cache of the appropriate MktPicture objects. Alternatively, an application may manually maintain at least one reference to each MktPicture TOC Object of interest at all times.

Primarily used by the MktPicture object, MktLevel objects represent a position or a level in the order stack of a complete market picture. This object contains the information for a particular price level including the price, total size, and the participants at the particular size. Primarily used through the MktLevel object, the MktParticipant object is the lowest level piece of a market price information. It represents an order on an exchange occupying a position in a particular order queue at a particular level in the market stack. It contains fields indicating the user identifier of the placer of the order and the identifier of the user (or users) to whom the participant is cleared.

At times, depending on the connector, a MktLevel's TotalSize may not equal the sum of the participants at that level. This can happen when an exchange's native API sends the market stack information at different rates than the participant information or when an exchange's native API is limited to a fixed number of participants. If such a situation is detected, an Exchange Connector generates a synthetic participant to account for the missing size at the level. The synthetic participant is flagged with a special user code and is the last participant in the participant array at a particular level.

The exchange user code is used to easily identify the difference between prices from different exchanges. They allow different exchange participants and synthetic participants to have different exchange values. Participant user codes are constructed as a mask of the form:

0xAEEEUUUU where:

'A' is a four bit Attribute mask (0x8 for synthetic participant)

'EEE' is a twelve bit Exchange mask which maps to the Exchange::ExchangeCode field 'UUUU' is a sixteen bit unique user code. User codes>1000 are actual users. User code 0x0001 indicates the synthetic user on that particular exchange.

The user code of '1' indicates an unknown external user. This can be masked with exchange codes to support different external users for the different exchanges and allows for consolidation of markets while maintaining originating participant information.

The Exchange object has a field ExchangeCode which is used to identify participants on that exchange. The field Exchange::ExchangeCode must be a twelve bit value of the form:

0x0xxx0000 where any of the 'xxx' bits can be set, i.e., (Exchange: ExchangeCode & ~0x0fff000)==0.

These values should be unique and the Exchange::ExchangeCode database field has a unique constraint requiring each exchange to have its own exchange code.

For example, if Broker1 has the exchange code 0x00010000 and Broker2 has the Exchange Code 0x00020000 the following could be different user codes:

0x80010001—Synthetic unknown Broker1 participant

0x0001038e—Broker1 user 1

0x0001038f—Broker1 user 2

0x8001038e—Indicative Synthetic participant for Broker1 user 2

0x80020001—Synthetic unknown Broker2 participant

0x0002038e—Broker2 user 1

0x0002038f—Broker2 user 2

0x8002038e—Indicative Synthetic participant for Broker2 user 2

At any given point in time ICE system 100 can produce a Consolidated Price Feed 265 containing liquidity available internally and externally. The Consolidated Price Feed 265 can contain each Private Market's order book, but a user is only able to see Private Markets that the user has permissions to see.

As an example of the consolidated market picture, assume the Internal Exchange 140 contains the orders shown in Tables 1-4 above. Then Private Market C 330 price feed/visible picture is shown below in Table 9.

TABLE 9

| Offer Size | Offer Price | Bid Price | Bid Size |
|---|---|---|---|
| 10 (3:10) | 99-132 | | |
| 15 (2:15) | 99-130 | | |
| 0 (2:15H) | 99-126 | | |
| | | 99-12+ | 25 (1:10, 4:15) |
| | | 99-120 | 20 (9:10, 6:10C) |
| | | 99-116 | 0, 50U (5:50U) |
| | | 99-11+ | 30 (8:30, 7:20H) |

Assume the external markets contain the following pictures:

TABLE 19

| | Example Broker 1 Market Picture | | |
|---|---|---|---|
| Offer Size | Offer Price | Bid Price | Bid Size |
| 8 | 99-132 | | |
| 18 | 99-130 | | |
| 7 | 99-126 | | |
| | | 99-12+ | 45 |
| | | 99-122 | 13 |
| | | 99-120 | 65 |

TABLE 11

| | Example Broker 2 Market Picture | | |
|---|---|---|---|
| Offer Size | Offer Price | Bid Price | Bid Size |
| 9 | 99-13+ | | |
| 13 | 99-130 | | |
| 8 | 99-126 | | |
| | | 99-12+ | 9 |
| | | 99-122 | 15 |
| | | 99-120 | 23 |
| | | 99-116 | 3 |

The Consolidated Price Feed shown for Private Market C 330 will look as shown in table 12, below, where "IE" indicates size on the Internal Exchange 280, "e" indicates size on Broker1, and "b" indicates size on Broke2. A "U" indicates unavailable size.

For the sake of clarity, the price feed picture below does not indicate the individual participant stacks at each price level for each exchange. However, the actual price feed can include individual participant lists for every price on each exchange that provides those lists.

TABLE 12

| | Consolidated Price Feed for Private Market (C) 330 | | |
|---|---|---|---|
| Offer Size | Offer Price | Bid Price | Bid Size |
| 18 (IE:10, e:8) | 99-132 | | |
| 9 (b:9) | 99-13+ | | |
| 46 (IE:15, e:18, b:13) | 99-130 | | |
| 15 (e:7, b:8) | 99-126 | | |
| | | 99-12+ | 79 (IE:25, e:45, b:9) |
| | | 99-122 | 28 (e:13, b:15) |
| | | 99-120 | 108 (IE:20, e:65, b:23) |
| | | 99-116 | 3, 50U (IE:0, 50U, b:3) |
| | | 99-11+ | 30 (18:30) |

If one of the external exchanges starts trading, the Consolidated Price Feed 265 indicates that condition. For example, assume Broker1 starts trading up at 99-126 with sellers offering 10 mM and buyers wanting 80 mM. The Consolidated Price Feed 265 reflects the Broker1 trading state as shown below:

TABLE 13

| | Consolidated Price Feed for Private Market (C) 330 with Broker 1 in Trading State | | |
|---|---|---|---|
| Offer Size | Offer Price | Bid Price | Bid Size |
| 18 (IE:10, e:8) | 99-132 | | |
| 9 (b:9) | 99-13+ | | |
| 46 (IE:15, e:18, b:13) | 99-130 | | |

TABLE 13-continued

| Consolidated Price Feed for Private Market (C) 330 with Broker 1 in Trading State | | | |
|---|---|---|---|
| Offer Size | Offer Price | Bid Price | Bid Size |
| 18 (e TRADING:10, b: 8) | 99-126 | 99-126 | 80 (e TRADING:80) |
| | | 99-12+ | 79 (IE:25, e:45, b:9) |
| | | 99-122 | 28 (e:13, b:15) |
| | | 99-120 | 108 (IE:20, e:65, b:23) |
| | | 99-116 | 3, 50U (IE:0, 50U, b:3) |
| | | 99-11+ | 30 (IE:30) |

Market order objects are used by the order processing subsystem of the Exchange Connectors 205, 210, 215, 220. They are used to track the orders as they are placed and manipulated on the exchange.

The adaptor which created the order performs any and all manipulations to the MktOrder and MktTransaction TOC objects based on API calls. Users should not directly edit these objects—doing so can introduce instability to the system. In order to change a value on MktOrder or MktTransaction objects, the user can make the appropriate Market Connector API calls.

MktOrder represents a user-placed order on an exchange. This object contains a summary of the order state. It is referenced by the individual transactions which change that global state. The order itself is a unified representation of all the low level transactions performed on the given order. The following are the various status and type codes for MktOrder.

| MktOrder::State | |
|---|---|
| Constant Value | Description |
| O | Open Order - Indicates that the order is open and out on the market. Open orders can be operated on by users or the exchange. |
| C | Closed Order - Indicates that the order is closed and no longer on the market. Updates may still occur on this order as processing may not be completed. A closed order cannot be operated on by a user but will accept informational upates from the exchange. The most common case is after an order is complete filled and closed but before the trade notification is received, the order will be in the closed state. Once the trade notification is received it will move to the done state. |
| D | Order Done - Indicates that all processing on the order is complete. Once an order is marked as done no further operations are accepted or updates to the TOC Object are applied. Done orders are removed from the active set of orders managed by the Exchange Connectors. |
| Z | Zombie - In certain cases, an Exchange Connector will shutdown with outstanding orders in the market - this may be due to explicit user shutdown, exchange disconnect messages, or in rare cases, a catastrophic failure. When this happens all orders still out on the market are automatically pulled and marked as zombie orders. |

| MktOrder::Action | |
|---|---|
| Constant Value | Description |
| P | Passive Order - Indicates a passive order on the market. |
| A | Active Order - Indicates and active order on the market. |
| M | Market Order - Not supported at this time. |

| MktOrder::TradingState | |
|---|---|
| Constant Value | Description |
| | Market is currently not trading. |
| H | HIT - Indicates that the market is trading down on the bid side. Sellers are the active side of the market. |
| T | TAKE - Indicates that the market is trading up on the offer side. Buyers are the active side of the market. |

| MktOrder::Side | |
|---|---|
| Constant Value | Description |
| B | Bid Side - Indicates the bid or buyers side of the market. |
| O | Offer Side - indicates the offer or sellers side of the market. |
| * | Any Side - Used to indicate both sides (buyers and sellers) of the market. |

MktTransaction indicates a particular operation on an exchange. Example transactions include ADD, MODIFY and CANCEL. Transactions apply to a given order and have a state of PENDING, CONFIRMED or ERROR. Invalid operations may result in ERROR transactions created again a NULL order. The following are MktTransaction status and Type codes.

| MktTransaction::Type | |
|---|---|
| Constant Value | Description |
| A | Add Transaction - Add transactions indicate an attempt to increase the current order from 0 to a new specified amount. Add transactions can only exist on an order. |
| C | Cancel Transaction - Cancel transactions indicate an attempt to remove any remaining outstanding size of a order. Cancel transactions can only exist on an order. |
| L | Cancel All Transaction - Cancel All transactions indicate an attempt to cancel a set of order. Cancel All transactions do not have a parent order. Instead the size on a Cancel All transaction will indicate the number of orders attempted to cancel. Each individual order will then have some sort of Cancel transaction indicating the operation. |
| X | Cancel All Exchange Order Transaction - Cancel All Exchange Orders transactions indicate an attempt (by an administrator user) to cancel all orders for all users outstanding on a particular |

MktTransaction::Type

| Constant Value | Description |
|---|---|
| | exchange. As with Cancel All transaction, Cancel All Exchange Orders transactions do not have a parent order. Instead, each individual order will have a Cancel transaction related to the Cancel All Exchange Orders transaction. |
| F | Fill Transaction - A fill transaction indicates a crossing and execution of the particular order. Fill transaction only exist on an order and will like the order to a MktTrade object recording the total filled size of an order. |
| D | Modify Delta Transaction - Indicates an attempt to modify the size of an order by some amount. The size can be either positive or negative and is added to the prior outstanding order size to create the new outstanding sizes. Modify Delta transactions can only exist on an order. |
| M | Modify Absolute Transaction - Indicates an attempt to modify the size of an order to a fixed total amount. Modify Absolute transactions can only exist on an order. |
| R | User Reprocess Request - Indicates an administrative transaction where a user explicitly requests that the internal state of the order is recomputed. This transaction does not interact with the exchange, nor record any such interaction. It instead indicates an internal computation and state validation. User Reprocess Requests only exist on a specific order. |
| ? | Unknown Transaction Type - Indicates that the type of a transaction is unknown. |

MktTransaction::Origin

| Constant Value | Description |
|---|---|
| ? | Unknown - Indicates that the originator or creator of this transaction record is unknown. |
| U | User - Indicates that the user initiated the transaction. |
| S | System - Indicates that an Exchange Connector is the originator or creator of the transaction recorder. This is used for internal system generated requests, such as cancel-on-shutdown and cancels resulting from a cancel-all operation. |
| E | Exchange - Indicates that the external exchange generated the transaction. This is used for transaction which, like fills, which occur on the exchange without prior request. |

MktTransaction::Status

| Constant Value | Description |
|---|---|
| N | New - The transaction is new and has not been sent to or processed by the underlying exchange. Transactions exist in the new state for a very short period of time. |
| P | Pending - The transaction is pending some type of external confirmation or rejection. A status type of pending will be set prior to sending the actual instruction to the underlying exchange. Upon exchange confirmation or rejection the status will be updated appropriately. Orders with one or more pending transactions will have a difference between their OpenSize and their ConfirmedOpenSize. When all pending transaction have been confirmed or rejected these order sizes will agree. |
| C | Confirmed - Indicates that the transaction has been accepted and applied by the underlying exchange. Confirmed transactions are considered complete in that the will no longer be updated. |
| E | Error - Indicates that the transaction has been rejected by the underlying exchange. A rejected transaction will have no effect on the target order. Error transaction are considered complete in that they will not longer be updated |
| X | Ignore - In certain cases an exchange will neither ignore it. Here the transaction has no effect on the underlying order as if it were rejected except that it may receive subsequent confirmation. Transactions are marked ignore if confirming or rejecting the transaction will have no effect on the target order. For example, sending three cancel instructions for a given order will generate three Cancel transactions. Once the first transaction is applied the remaining two will have no effect on the order. As a result these two pending transactions will be marked as 'ignore' if and when the first is confirmed. |
| U | Undefined - When the state of a transaction is not know, it will be marked as undefined. Undefined transactions should only exist in the system for very short periods of time. |

Figure 7:
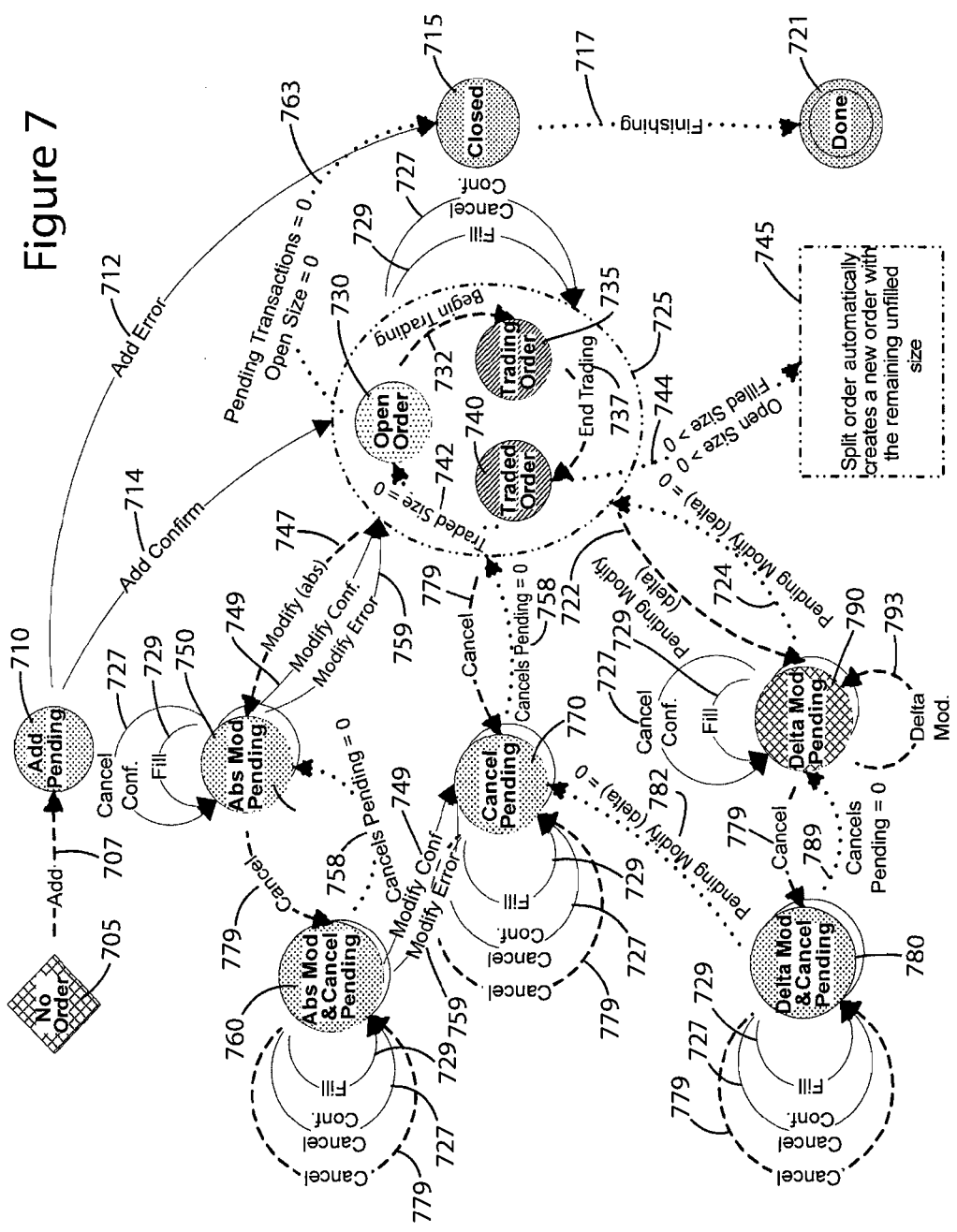
FIG. 7 illustrates an order state diagram for a process in accordance with an embodiment of the invention.

FIG. 7 illustrates an order state diagram for a Uniform Order Model process 700 that controls each order's lifecycle. A new order begins with an AddOrder command. This order continues to exist until one of the following:

The order is canceled (either by the user or the exchange);
The order is completely filled and exits a trading market; or
The order enters and exits a trading market.

An order is said to partake in a trading market if the order is at the trading price during the time of workup. When the trading market completes the order either has an outstanding size or it is completely filled. If there is outstanding size, the remaining order size is canceled and a new order for the remaining size is automatically created. Note that orders behind the trading price during a trading market are not considered part of the trading market and are unaffected by the changes in trading state.

Most Exchange Connectors 205, 210, 215, 220 make use of instruction translation to enforce the uniform order model. Depending on the functionality of the external exchange, the Exchange Connectors may have to intelligently route user's requests in appropriate transactions to uphold the order model. Instruction translators modify a user's request to perform the appropriate equivalent supported action for the exchange. For example, on exchanges which only support one outstanding order on a given side at a given price for a particular instrument, AddOrder user requests can be automatically transformed into a delta modification on a pre-existing existing order. The transaction resulting from the user's request can contain information of the true operation executed on the exchange.

The following common instruction translators or combinations thereof, exist:

Add-To-Modify-Up—For exchanges which require only one order per instrument per side and price, the Add-To-Modify-Up translator automatically converts new AddOrder requests into delta order modifications by the added amount.

For example, if an outstanding bid order for 10 exists at 100-12+ and the user places an AddOrder for another 20. That add order request is translated into a modification upwards of 20 on the original order.

Delta-To-Absolute—For exchanges which only support placement of orders for absolute sizes, the Delta-To-Absolute translator translates all delta order modifications into an absolute modification for the total size. For example, if an outstanding bid order for 10 exists at 100-12+ and the user places an AddOrder for another 20. That add order request is translated into a modification of the original order to a total size of 30.

With reference to FIG. 7, state 705 refers to the condition where there is no order in existence. At step 707, the user add function 707 is executed by a client 260 utilizing the ICE API 255. As a result of the user add function 707 executing, the system can transition to state 710 where the user add is pending. If the result of the add function yields an add error 712 as an exchange transaction, the system can transition to state 715 where the order is closed. After the order is closed at 715, the conditions for the finishing function are met and the finishing function is executed resulting in the system transitioning to the Done state 720 where the order addition is completely terminated. Alternatively, if the exchange add function 707 executes successfully resulting in an add confirm on the exchange, the system transitions to the primary order execution state 725.

The primary order execution conditional state 725 is not an actual state but a loop of states that continually execute until desired conditions are met. One such condition is when the Pending Transactions=0 and OpenSize=0 at step 763. At this point, the state responsible for the filling and trading of the confirmed orders stops executing and transitions to the closed order state 715 followed by the finishing function 717 transitioning to the done state 720.

Within conditional state 725, there are three states. The conditional state 725 begins at the open order state 730. The begin trading function 732 is executed by the user resulting in the trading order state 735. Next, the user executes the End Trading function 737 resulting in the Traded Order state 740. Now, the system determines whether the Open Size is greater than zero and the loan Filled Size also greater than zero at step 744. If both conditions are met, the conditional state 725 partially filled an order. The system corrects for this by creating a new order for the unfilled portion of the order at conditional transition 744 and step 745. This results in at least one order having a traded size=0 if there are still orders to fill. From the traded order state, the system determines if there is an open order with a traded size=0 at conditional step 742. If an order with a traded size=0 exists, the conditional state 725 can cycle through this process all over again until this condition fails and the system determines that Pending Transactions=0 and OpenSize=0 at conditional transition 763 as discussed above.

While the system is executing the conditional loop 725 attempts to fill all outstanding trades for a given order. The user can initiate three different types of transactions: an absolute modification (Abs Mod) 747; a delta modification (Delta Mod) 722; or a Cancel 779. When the user initiates an Abs Mod transaction 747, the system transitions to the Abs Mod Pending state 750. At the Abs Mod Pending state 750, the system executes an exchange transaction either confirming the modification at 749 or sending an error message regarding the modification at 759. The exchange can also automatically either fulfill the request at 729 or cancel the confirmation at 727. While the system is at the Abs Mod Pending state 750, the user can enter a cancel transaction 779 to transition the system to the Abs Mod & Cancel Pending state 760. While the system is in the Abs Mod & Cancel Pending state 760, the system can either cancel the confirmation 727, fulfill the modification 729, or the user can cancel the cancellation 779. If the user cancels, then conditional transaction 758 can be triggered because cancels pending equals zero. This state can revert the system back to Abs Mod Pending state 750. Alternatively, the system can transition from the Abs Mod & Cancel Pending state 760 to the Cancel Pending state 770 by the exchange confirming the modification 749 or generating an error message regarding the modification 759. The system can then remain in the Cancel Pending state 770 until the cancels pending=0 to trigger conditional 758 to transition the system state back to the conditional loop 725.

When the user initiates a Delta Mod transaction 722, the system transitions to the Delta Mod Pending state 790. At the Delta Mod Pending state 790, the system can automatically either fulfill the request at 729 or cancel the confirmation at 727. While the system is at the Delta Mod Pending state 750, the user can enter a Delta Mod transaction 793 resulting in a change in the order. Once the Pending Delta Modify equals zero, conditional transaction 724 can transition the system from the Delta Mod Pending state 790 back to the conditional loop 725. Alternatively the user can enter a cancel transaction 779 to transition the system to the Delta Mod & Cancel Pending state 780. While the system is in the Delta Mod & Cancel Pending state 780, the system can either cancel the confirmation 727, fulfill the modification 729, or the user can cancel the cancellation 779. If the user cancels, then conditional transaction 789 can be triggered because cancels pending will equal zero. This can revert the system back to Delta Mod Pending state 790. Alternatively, the system can transition from the Delta Mod & Cancel Pending state 780 to the Cancel Pending state 770 if the pending delta modify equals zero at transition 782. The system can then remain in the Cancel Pending state 770 until the cancels pending=0 to trigger conditional 758 to transition the system state back to the conditional loop 725.

The remaining possible state can be obtained when a user enters a cancel transaction 779 from the conditional loop state 725. Upon this happening, the system transitions to state 770 where the exchange can cancel the confirmation 727, fulfill the request 729, or the user can cancel the cancellation 779. Once cancels pending equals zero at transition 758, the system can revert back to the conditional loop 725 and wait for suitable actions to occur and transition the system to another state. Eventually, once all orders are fulfilled, the system can transition to the done state 720.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

We claim:

1. A method for implementing an order routing strategy on a computer-based communication network including a first electronic exchange operating on a first server having a processor, one or more second electronic exchange operating on respective second servers having respective processors, and an end-user interface operating on a client terminal having a processor, the method steps executed by at the first server, comprising:

receiving from the client terminal an order that defines a quantity component, a price component, and a routing strategy associated with the order, the routing strategy containing a stipulation string comprising parameters of predetermined criteria, wherein the predetermined criteria is at least one of an overfill risk factor, a prioritized list of external electronic exchanges, an exchange order size portion limit, an internal order indicator value, and an internal order fill time;

allocating a first order quantity to a crossing location using a first phase order process in accordance with the predetermined criteria parameters;

allocating a second order quantity to an idle location using a second phase order process;

wherein the first order quantity fills substantially immediately and the second order quantity fills when trading begins at the idle location;

receiving an event message;

evaluating rules of the routing strategy in the order received from the client terminal in response to the event message, wherein evaluating rules of the routing strategy utilizes at least one of the internal order indicator value and the internal order fill time to cause the first phase order process to occur for a period of time prior to the occurrence of the second phase order process; and modifying the routing strategy execution in response to the results of the evaluating step so as to optimize the order processing on at least one of the crossing location and the idle location.

2. The method of claim 1, wherein the event message is at least one of a price update, a quantity update, an electronic exchange coming online, an electronic exchange going offline, an order status message, and a user request.

3. The method of claim 1, wherein the first phase order process comprises:

working a portion of the first order quantity at crossing levels on at least one of the first electronic exchange and at least one of the respective second electronic exchanges;

giving priority among plural working portions of respective orders to more aggressively priced crossing levels; and placing the working portions of the respective orders in preference based on at least one of the predetermined criteria.

4. The method of claim 3, wherein the placing step places the working portion to selected ones of the second electronic exchanges in accordance with a second exchange priority criteria.

5. The method of claim 1, further comprising placing, upon an inability to cross at the crossing location and the idle location, any remaining order liquidity on an external electronic exchange so that the order will fill when trading begins at the external electronic exchange.

6. The method of claim 1, further comprising identifying an idle location by determining that a particular exchange lacks a pending quantity at a price level for the order.

7. The method of claim 6, further comprising increasing the second order quantity by an overfill risk factor criteria.

8. The method of claim 1, wherein the crossing location is an internal electronic exchange operated on the first server, and the idle location is one or more external electronic exchanges operated on the respective second servers.

9. The method of claim 8, wherein upon a timeout occurrence at the idle location, the method further comprises allocating at least a portion of the second order quantity to the internal electronic exchange.

10. The method of claim 8, further comprising restricting a pending time period of the first order quantity placed on the internal electronic exchange before the first order quantity can be filled on one or more of the external exchanges, thereby improving the chances of filling the first order quantity on the internal exchange.

11. The method of claim 10, wherein upon expiration of the pending time period, the method further comprising:

reevaluating the order routing strategy; and based on the results of the reevaluating step, placing the first order quantity on one or more external exchanges so as to optimize the order processing.

12. The method of claim 1, wherein the crossing location is a first external electronic exchange operated on the first server, and the idle location is one or more second external electronic exchanges operated on the respective second servers.

13. The method of claim 1, further comprising:

receiving an updated stipulation string for the routing strategy, wherein at least one of the parameters of predetermined criteria is changed; and performing the first phase order process and the second phase order process in accordance with the parameters of predetermined criteria changed in the updated stipulation string.

* * * * *